US006907183B1

United States Patent
Yoshida

(12) United States Patent
(10) Patent No.: US 6,907,183 B1
(45) Date of Patent: Jun. 14, 2005

(54) DISPLAY DEVICE AND DISPLAY METHOD

(75) Inventor: Mitsunobu Yoshida, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/536,024

(22) Filed: Mar. 27, 2000

(30) Foreign Application Priority Data

Jun. 30, 1999 (JP) .......................................... 11-186992

(51) Int. Cl.$^7$ ............................................... G02B 6/00
(52) U.S. Cl. ..................................... 385/147; 385/901
(58) Field of Search .............................. 385/147, 901, 385/15, 16, 32, 19, 25, 27, 30, 31, 36, 37, 47, 48, 84; 349/113, 5; 345/84, 147; 359/49

(56) References Cited

U.S. PATENT DOCUMENTS

| 4,726,662 A | * | 2/1988 | Cromack ..................... 349/57 |
| 4,822,145 A | | 4/1989 | Staelin |
| 5,184,238 A | * | 2/1993 | Wright .......................... 349/5 |
| 5,771,321 A | * | 6/1998 | Stern ........................... 385/31 |
| 6,323,833 B1 | * | 11/2001 | Takeuchi et al. ............. 310/331 |
| 6,470,115 B1 | * | 10/2002 | Yonekubo ..................... 385/32 |

FOREIGN PATENT DOCUMENTS

| JP | 2-106791 | 4/1990 |
| JP | 11-72721 | 3/1999 |
| JP | 11-073142 | 3/1999 |

OTHER PUBLICATIONS

H. Yuan, et al., "Demonstration of a Waveguide–Based LCD," SID 99 Digest, 1999, pp. 714–717.

* cited by examiner

Primary Examiner—Tarifur R. Chowdhury
Assistant Examiner—Prasad Akkapeddi
(74) Attorney, Agent, or Firm—Oblon, Spivak, McClelland, Maier & Neustadt, P.C.

(57) ABSTRACT

This invention provides a display device and a display method in which a light source irradiates a light transmitting member with light, the light transmitting member outputs a light component having directivity as display light, and the behavior of this light at the interface between a light transmitting material and the light transmitting member is switched between total reflection and transmission by changing the contact state between them, thereby changing the intensity of the display light.

12 Claims, 11 Drawing Sheets

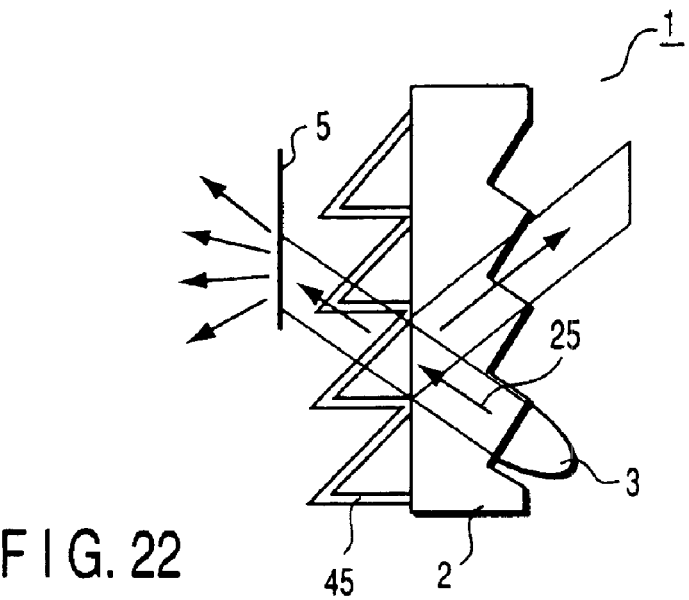
F I G. 22
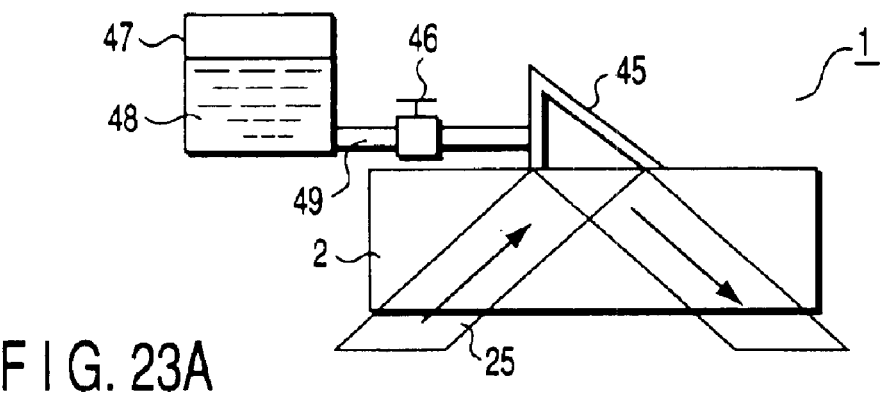
F I G. 23A
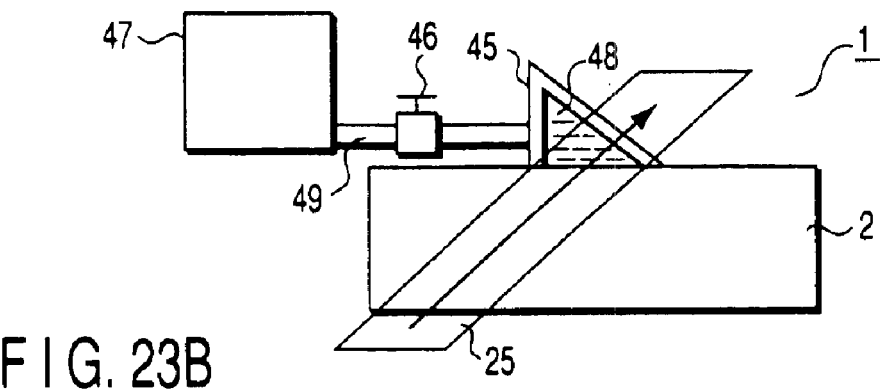
F I G. 23B

DISPLAY DEVICE AND DISPLAY METHOD

CROSS-REFERENCE TO RELATED APPLICATIONS

This application is based upon and claims the benefit of priority from the prior Japanese Patent Application No. 11-186992, filed Jun. 30, 1999, the entire contents of which are incorporated herein by reference.

BACKGROUND OF THE INVENTION

The present invention relates to a display device and a display method and, more particularly, to a display device and a display method using a non-light emitting element.

As a display device having pixels arrayed in a matrix manner, a liquid crystal display (to be referred to as an LCD hereinafter) is widely used. An LCD has the advantages that a small and thin display can be formed and a large screen can be realized by improving an optical system. Therefore, research and development of LCDs are being extensively made.

An LCD displays images by using changes in the optical characteristics of a liquid crystal material due to voltage application. A typical LCD has a structure in which a liquid crystal layer is sandwiched between a pair of substrates which have electrodes on their opposing surfaces and are subjected to an alignment treatment, and polarizing plates are adhered to the outer surfaces of these substrates.

In this LCD, only a light component in a specific polarizing direction of light emitted from a light source is sent into the liquid crystal layer, and the polarizing direction of light emerging from the liquid crystal layer is changed in accordance with the voltage applied to the liquid crystal layer, thereby changing the quantity of transmitted light. Hence, the light utilization efficiency of this LCD is a maximum of at most 50%, and less than 10% in reality. Therefore, an LCD like this requires a high-luminance light source, and this increases the ratio of the consumption power of the light source to the whole consumption power. Additionally, in an LCD the influence of light leaking when dark colors are displayed is large, so it is difficult to realize high contrast.

As a technique for solving the above consumption power problem, U.S. Pat. No. 4,822,145 has disclosed an LCD using a combination of a light source and a plate-like light waveguide. This LCD has a structure in which a liquid crystal layer is formed in contact with one surface of the waveguide. In this display device, when dark colors are displayed, light from a light source is confined in the waveguide by total reflection. When light colors are displayed, the light confined in the waveguide is fed into the liquid crystal layer by changing the alignment state of liquid crystal molecules and is thereby output to the outside as display light. This display device can reduce the consumption power of the light source. However, this display device cannot realize high contrast because a liquid crystal is used to switch ON and OFF of pixels. Also, since the display device uses the waveguide, light entering the liquid crystal layer has no directivity. That is, output light from this display device is diffused light having no directivity. This makes it difficult to use this display device as a projection display in which a scattering surface is set apart from a liquid crystal panel.

Jpn. Pat. Appln. KOKAI Publication No. 11-73142 has disclosed a display device which, instead of using a liquid crystal, extracts light by moving a transparent member into contact with and away from one surface of a plate-like waveguide by using an actuator. In this display device, when dark colors are displayed the transparent member is moved away from one surface of the waveguide, thereby confining light from a light source in the waveguide by using total reflection. When light colors are displayed, the transparent member is brought into contact with one surface of the waveguide. Consequently, the light confined in the waveguide is output to the outside as display light from the side of the waveguide away from the transparent member. Since this display device uses no liquid crystal, high contrast can be realized. However, the output light is diffused light having no directivity because this display device also uses the waveguide. This makes this display device difficult to use as a projection display.

BRIEF SUMMARY OF THE INVENTION

As described above, the conventional display devices have various problems that the light utilization efficiency is low, no high contrast can be realized, and they cannot be used as a projection display.

It is an object of the present invention to provide a novel display device and display method having high light utilization efficiency.

It is another object of the present invention to provide a novel display device and display method capable of achieving high contrast.

It is still another object of the present invention to provide a novel display device and display method capable of projection type image display.

It is still another object of the present invention to provide a novel display device and display method having high light utilization efficiency, capable of achieving high contrast, and capable of projection type image display.

According to the first aspect of the present invention, there is provided a display device comprising a light transmitting member, a light source for irradiating the light transmitting member with light, and a control mechanism for switching between total reflection and transmission the behavior of the light, incident into the light transmitting member from the light source, at an interface between the light transmitting member and an external region adjacent to the light transmitting member, wherein at least a portion of the light emitted by the light source to irradiate the light transmitting member is output as a light component having directivity from the light transmitting member, and the light component is used to display images.

According to the second aspect of the present invention, there is provided a display device comprising a light transmitting member, a light source for irradiating the light transmitting member with light, and a plurality of control mechanisms arrayed on the light transmitting member to switch between total reflection and transmission the behavior of light, incident into the light transmitting member from the light source, at an interface between the light transmitting member and an external region adjacent to the light transmitting member, wherein at least a portion of the light emitted by the light source to irradiate the light transmitting member is output as a light component having directivity from the light transmitting member, and the light component is used to display images.

According to the third aspect of the present invention, there is provided a display device comprising a light transmitting member, a light transmitting material, a light source for irradiating the light transmitting member with light, and a control mechanism for changing a contact state of the light transmitting material with respect to the light transmitting member on an optical path of the light, wherein at least a portion of the light emitted by the light source to irradiate the light transmitting member is output as a light component having directivity from the light transmitting member, and the light component is used to display images.

According to the fourth aspect of the present invention, there is provided a display device comprising a light transmitting member, a light transmitting material, a light source for irradiating the light transmitting member with light, and a plurality of control mechanisms arrayed on the light transmitting member to change a contact state of the light transmitting material with respect to the light transmitting member on an optical path of the light, wherein at least a portion of the light emitted by the light source to irradiate the light transmitting member is output as a light component having directivity from the light transmitting member, and the light component is used to display images.

According to the fifth aspect of the present invention, there is provided a display device comprising a plate-like light transmitting member, a light source placed on the side of one principal surface of the light transmitting member to irradiate the one principle surface with light, a transparent member capable of moving close to and away from the other principle surface of the light transmitting member, and a moving mechanism for changing the state of the transparent member with respect to the other principle surface of the light transmitting member between a contact state and a separated state.

According to the sixth aspect of the present invention, there is provided a display device comprising a plate-like light transmitting member, a light source placed on the side of one principle surface of the light transmitting member to irradiate the one principle surface with light, a plurality of transparent members capable of moving close to and away from the other principle surface of the light transmitting member, and a plurality of moving mechanisms for changing the states of the plurality of transparent members with respect to the other principle surface of the light transmitting member between a contact state and a separated state.

According to the seventh aspect of the present invention, there is provided a display device comprising a light transmitting member, a light source for irradiating the light transmitting member with light, a supply mechanism for supplying a liquid onto the light transmitting member, and a removal mechanism for removing the liquid supplied onto the light transmitting member.

According to the eighth aspect of the present invention, there is provided a display device comprising a light transmitting member, a light source for irradiating the light transmitting member with light, a plurality of supply mechanisms for supplying a liquid onto the light transmitting member, and a plurality of removal mechanisms for removing the liquid supplied onto the light transmitting member.

According to the ninth aspect of the present invention, there is provided a display method comprising the step of switching between total reflection and transmission a behavior of light, incident into a light transmitting member from a light source, at an interface between the light transmitting member and an external region adjacent to the light transmitting member, wherein one of light transmitted through the interface and light totally reflected by the interface is output as a light component having directivity from the light transmitting member, and the light component is used to display images.

According to the 10th aspect of the present invention, there is provided a display method comprising the step of irradiating a light transmitting member with light from a light source and changing a contact state of a light transmitting material with respect to the light transmitting member on an optical path of the light, wherein at least a portion of the light incident into the light transmitting member from the light source is output as a light component having directivity from the light transmitting member, and the light component is used to display images.

According to the 11th aspect of the present invention, there is provided a display method comprising the step of irradiating one principle surface of a plate-like light transmitting member with light from a light source and moving a transparent member into contact with and away from the other principle surface of the light transmitting member, wherein images are displayed by using an intensity change of output light from the light transmitting member, which occurs when the transparent member is moved.

According to the 12th aspect of the present invention, there is provided a display method comprising the steps of supplying a liquid onto a light transmitting member while irradiating the light transmitting member with light, and removing the liquid supplied onto the light transmitting member while irradiating the light transmitting member with light, wherein images are displayed by using an intensity change of output light from the light transmitting member, which occurs when the liquid is supplied onto and removed from the light transmitting member.

In the present invention, of light incident into the light transmitting member, an intensity change of one of light transmitted through the interface with the external region and light totally reflected by this interface is used to display images. That is, in the present invention images are displayed using changes between transmission and total reflection.

This change between transmission and total reflection can be produced by changing the critical angle of light incident into the external region from the light transmitting member, e.g., by changing the refractive index of the external region.

In the present invention as described above, images are displayed using changes between transmission and total reflection. Ideally, therefore, the intensity of light output when dark colors are displayed is set to 0%, and the intensity of light output when light colors are displayed is set to 100%. Each of these light intensities is achieved by using parallel light as a light source and preventing light scattering and light reflection; in principle light loss due to light scattering or light reflection can be reduced. Accordingly, the present invention can improve the light utilization efficiency, reduce the consumption power, and display images with high contrast.

In the present invention, output light from the light source is light having directivity, in particular, parallel light. However, this output light from the light source need not always be parallel light. For example, if the output light from the light source is not completely parallel light, the total reflection conditions need only be controlled to such an extent that all light components of incident light are totally reflected. Also, if the output light from the light source is not completely parallel light, not all light components of incident light need be totally reflected. That is, the aforementioned effects can be obtained if most light components of incident light are totally reflected, although the effects are not as good as when all light components are totally reflected.

In the present invention, at least a portion of light emitted by the light source to irradiate the light transmitting member is output as a light component having directivity from the light transmitting member, and this light component is used to display images. In the present invention, therefore, a light scattering surface can be placed near or away from the light transmitting member. That is, a display device of the present invention can be used as either a flat display or a projection display. It is preferable that the directivity of the light component output from the light transmitting member is so high enough to make the display be used as projection display. More preferably, the light component output from the light transmitting member is parallel light.

Changes between transmission and total reflection can be produced by, e.g., changing the refractive index of the external region of the light transmitting member. This refractive index change of the external region of the light transmitting region can be produced by changing the contact state between the light transmitting member and the light transmitting material.

For example, when a transparent member is used as the light transmitting material, this transparent member is set to face the light transmitting member, and the state of the transparent member with respect to the light transmitting member is changed between a contact state and a separated state by using the moving mechanism. In this manner, changes between total reflection and transmission can be produced. That is, in the separated state a material, usually a gas such as air or vacuum, having a lower refractive index than that of the light transmitting member, is interposed between the transparent member and the light transmitting member, and the transparent member is made from a material having a higher refractive index than that of the former material. Consequently, changes between transmission and total reflection can be produced by using a state change between the contact state and the separated state.

If the transparent member has elasticity, the contact area between this transparent member and the light transmitting member can be changed in accordance with a force applied from the moving mechanism to the transparent member. Accordingly, a grayscale image can be displayed.

A liquid can also be used as the transparent member. When this is the case, changes between transmission and total reflection can be produced by supplying and removing a liquid onto and from the light transmitting member by using the supply mechanism and the removal mechanism. For example, it is possible to cause total reflection when the external region is filled with air and transmission when the air is replaced with a liquid (a liquid has a higher refractive index than air). Note that when a liquid is used as the light transmitting member, the supply mechanism and the removal mechanism constitute a control mechanism. Note also that the supply mechanism and the removal mechanism usually constitute a control mechanism capable of supplying and removing a liquid onto and from the light transmitting member.

In the present invention, a plurality of control mechanisms are commonly used, and these control mechanisms are arrayed with respect to the light transmitting member. The term "array" herein used includes both one- and two-dimensional arrays. A plurality of light sources can be arrayed in one-to-one correspondence with these control mechanisms, or a single light source can be used.

In the present invention, output light from the light transmitting member is commonly converted into scattered light by a scattering screen. Examples of this scattering screen are a transmitting screen integrated with the display device, a transmitting screen separated from the display device, and a reflecting screen separated from the display device.

When the display device of the present invention is applied to a projection display, the scattering surface must be spaced apart from the light transmitting member and the transparent member. When the display device of the present invention is applied to a non-projection display such as a flat display, the scattering surface can be spaced apart from the light transmitting member and the transparent member or formed on the surface of one of these members. However, the scattering surface cannot be formed on an incident surface at which light from the light source is incident on the light transmitting member or on an interface between the light transmitting member and the transparent member. Note that a lens can be inserted between the light transmitting member and the scattering surface.

In the present invention, the refractive index of the light transmitting member is commonly uniform, but this refractive index need not always be uniform. That is, the light transmitting member can be composed of first and second portions having different refractive indices. Although in this case these first and second portions have different total reflection conditions, it is only necessary to emit light in different directions to the first and second portions or make the shapes of the first and second portions different from each other.

In the display device of the present invention, that surface of the light transmitting member which faces the light source is preferably provided with projections and depressions designed to improve the efficiency of incidence of light from the light source into the light transmitting member. Also, in the display device of the present invention, that surface of the light transmitting member, which faces the light source is preferably provided with projections and depressions designed to prevent light totally reflected by the interface between the light transmitting member and the external region from being totally reflected again by another interface.

When the display device of the present invention comprises a plurality of control mechanisms, a plurality of moving mechanisms, or a plurality of supply and removal mechanisms, a driving circuit for driving these mechanisms independently of each other in accordance with image information is preferably included. In particular, this driving circuit preferably has a plurality of information holding units for holding image information in one-to-one correspondence with the mechanisms.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 22 is a side view schematically showing a display device according to the fifth embodiment of the present invention; and FIGS. 23A and 23B are side views schematically showing the display device according to the fifth embodiment of the present invention.

DETAILED DESCRIPTION OF THE INVENTION

Figure 1:
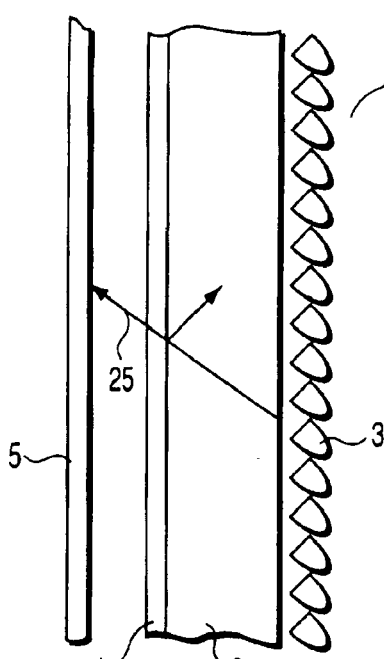
FIG. 1 is a side view schematically showing one example of a display device according to the first to fifth embodiments of the present invention.

The first to fifth embodiments of the present invention will be described in detail below with reference to the accompanying drawings. Note that the same reference numerals denote the same parts in these drawings, and a duplicate description thereof will be omitted. First, the common matters of the first to fifth embodiments will be described.

FIG. 1 is a side view schematically showing one example of a display device according to the first to fifth embodiments of the present invention. A display device 1 shown in FIG. 1 has a plate-like transparent substrate 2, a plurality of light sources 3, a controller 4 as a control mechanism, and a transmitting screen 5 as a scattering surface. Note that the transparent substrate 2 is equivalent to a light transmitting member. Note also that the controller 4 is simplified in FIG. 1 and details of its structure will be described later in each embodiment.

In this display device 1, light 25 emitted from the light source 3 obliquely enters the transparent substrate 2 and reaches that surface of the transparent substrate 2, which opposes the screen 5. When light colors are displayed, the controller 4 transmits the incident light 25 toward the screen 5. When dark colors are displayed, the controller 4 totally reflects the incident light 25 at that surface of the transparent substrate 25, which faces the screen 5. As a consequence, images are displayed on the screen 5 made of, e.g., ground glass or tracing paper.

The display device 1 shown in FIG. 1 displays dark colors by using total reflection. However, light colors can also be displayed using total reflection. This operation will be described below with reference to FIG. 2.

Figure 2:
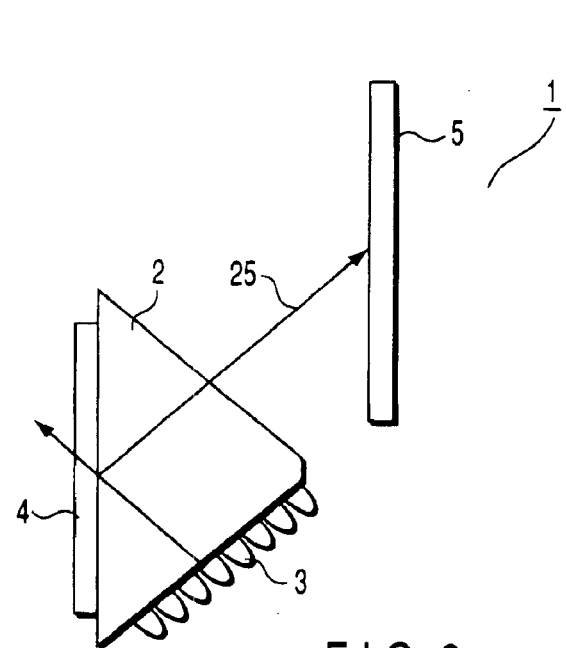
FIG. 2 is a side view schematically showing another example of the display device according to the first to fifth embodiment of the present invention.

FIG. 2 is a side view schematically showing another example of the display device according to the first to fifth embodiments of the present invention. A display device 1 shown in FIG. 2 has a transparent substrate 2, a plurality of light sources 3, a plurality of controllers 4, and a screen 5 as a scattering surface. In FIG. 2, the transparent substrate 2 is equivalent to a light transmitting member and the controllers 4 are simplified, as in FIG. 1.

In the display device 1 shown in FIG. 2, unlike the display device 1 shown in FIG. 1, the screen 5 is not placed on the side of the controllers 4; this screen 5 is so set as to scatter totally reflected light 25. Also, the transparent substrate 2 is a triangular pillar, not a flat plate. The structure of the display device 1 as shown in FIG. 2 increases the size of the transparent substrate 2 but can realize high contrast compared to the structure shown in FIG. 1.

In the display devices 1 shown in FIGS. 1 and 2, as the transparent substrates 2 it is possible to use, e.g., optical glass such as ruby or sapphire or an optical resin such as polycarbonate or styrene. A commercially available material such as KRS-5 can also be used as the transparent substrates 2.

Figure 3A:
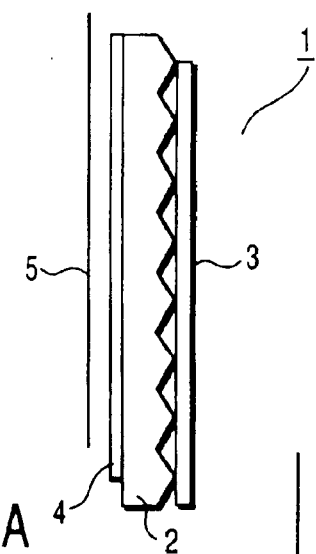
FIGS. 3A to 3C are side views schematically showing light sources used in the display device according to the first to fifth embodiments of the present invention.
Figure 3B:
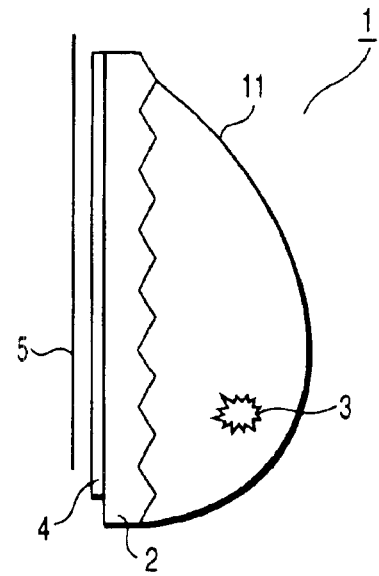
Figure 3C:
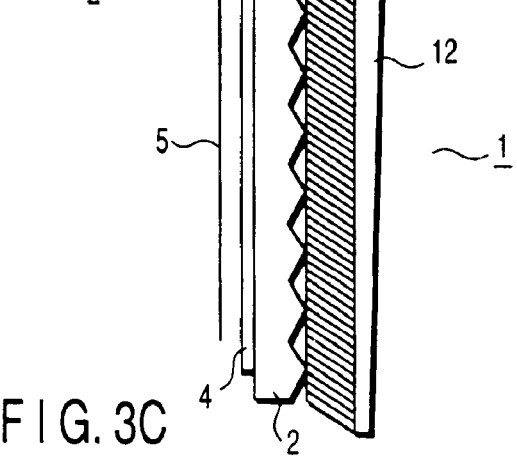

In these display devices 1, generally used light sources can be used as the light sources 3. The light sources 3 used in the display devices 1 will be described below with reference to FIGS. 1, 2, and 3A to 3C. FIGS. 3A to 3C are side views schematically showing the light sources 3 used in the display devices 1 according to the first to fifth embodiments of the present invention.

For example, light-emitting diodes or semiconductor lasers can be used as these light sources 3. When this is the case, as shown in FIGS. 1 and 2, these light-emitting diodes or semiconductor lasers can be used as a light-emitting diode array or a semiconductor laser array, respectively. Alternatively, as shown in FIG. 3A, a surface emission laser can be used as the light source 3. When a laser is used as the light source 3, parallel light can be output, so undesired light transmission can be prevented when dark colors are displayed. Additionally, the display device can be made thin because no device for collimating light from the light source 3 into parallel light is necessary.

A lamp such as a halogen lamp or a fluorescent lamp which emits diffused light can also be used as the light source 3. For example, when a halogen lamp is used as the light source 3, a concave parabolic mirror 11 as shown in FIG. 3B can be used to collimate light incident on the light transmitting member 2 into parallel light as much as possible and increase the light utilization efficiency. When a fluorescent lamp is used as the light source 3, the entire surface of the transparent substrate 2 can be irradiated with light by using a plate-like waveguide 12 as shown in FIG. 3C. Although light emerging from the waveguide 12 is not parallel light, this light can be collimated into parallel light through slits 13 interposed between the waveguide 12 and the transparent substrate 2. This display device 1 having the structure as shown in FIG. 3C is characterized by small light quantity variations.

That surface of the transparent substrate 2, which opposes the light sources 3 and its surface opposing the controller 4 are preferably not parallel to each other. When these surfaces are not parallel, it is possible to prevent light totally reflected by the surface opposing the controller 4 from being totally reflected again by the surface opposing the light source 3 and returning to the surface opposing the controller 4.

Figure 4A:
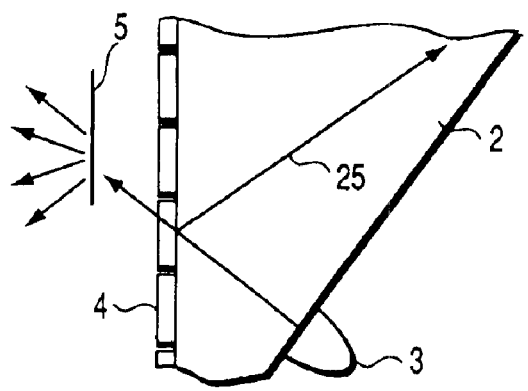
FIGS. 4A and 4B are side views showing, in an enlarged scale, light transmitting members used in the a display device according to the first to fifth embodiments of the present invention.
Figure 4B:
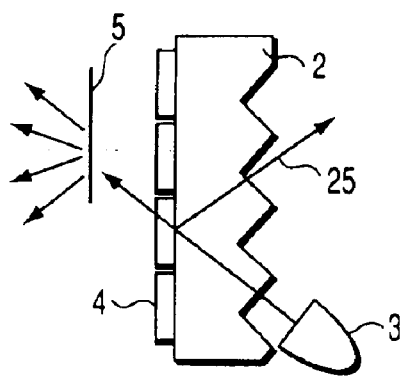

FIGS. 4A and 4B are side views showing, in an enlarged scale, the transparent substrate 2 used in the display device 1 according to the first to fifth embodiments of the present invention. In the transparent substrate 2 shown in FIG. 4A, a surface which opposes the light source 3 is composed of a single flat surface. In the transparent substrate 2 shown in FIG. 4B, a surface which opposes the light source 3 is composed of a plurality of flat surfaces.

In the transparent substrate 2 shown in FIG. 4A, the surface opposing the light source 3 is so designed as to totally reflect the light 25 which is totally reflected by the surface opposing the controller 4. The light totally reflected by the surface opposite to the light source 3 propagates upward in FIG. 4A to reach the end face (not shown). This end face (not shown) is so formed that the light totally reflected by the surface opposite to the light source 3 is incident at an incident angle of, e.g., 0°. Accordingly, the light reaching this end face is output to the outside without being totally reflected.

On the other hand, in the transparent substrate 2 shown in FIG. 4B, the surface opposing the light source 3 is so designed as not to totally reflect the light which is totally reflected by the surface opposing the controller 4; a large quantity of the light reaching the surface opposite to the light source 3 is transmitted. Therefore, when the transparent substrate 2 shown in FIG. 4A or 4B is used, light emerging from that surface of the transparent substrate 2, which opposes the controller 4, can be suppressed when the light is totally reflected.

In the transparent substrate 2 shown in FIG. 4A, the surface opposing the light source 3 can be formed with relative ease because this surface is composed of a single flat surface. Also, the transparent substrate 2 shown in FIG. 4B can be made thin, and this is effective to make a display device thinner.

When the transparent substrate 2 is formed using glass, it can be formed by using the glass grinding technique, glass etching technique, cutting technique, and the like. When the transparent substrates 2 shown in FIGS. 4A and 4B are formed using a transparent resin, they can be formed by using the cast-molding technique, compression molding technique, injection molding technique, and the like.

The refractive index of the transparent substrate 2 has influence on the structure of the display device 1. For example, when the transparent substrate 2 is used as a light transmitting member, the critical angle is determined in accordance with the refractive index of the transparent substrate 2. The direction of the optical axis of the light source 3 is set on the basis of this critical angle. The critical angle will be described below with reference to FIG. 5.

Figure 5:
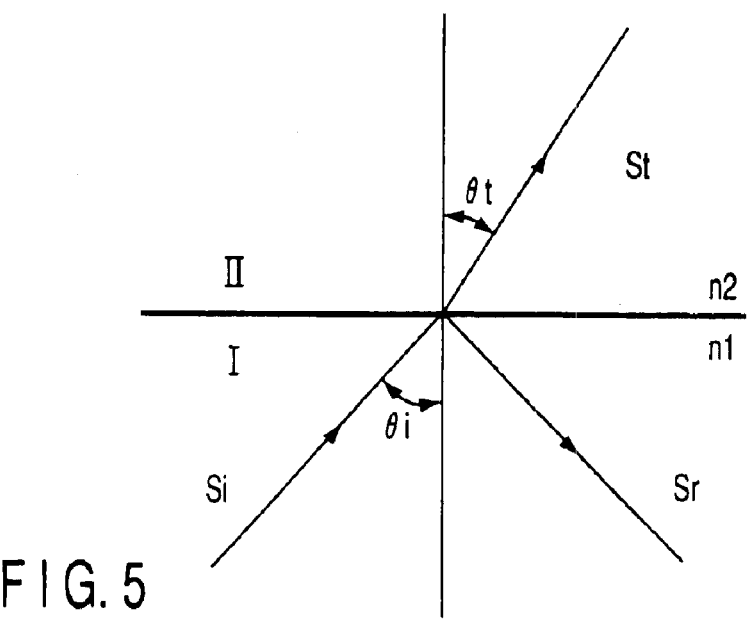
FIG. 5 is a schematic view for explaining the law of light refraction.

FIG. 5 is a schematic view for explaining the law of light refraction. As shown in FIG. 5, when incident light $S_i$ is incident at an incident angle $\theta_i$ into a medium II having a refractive index $n_2$ from a medium I having a refractive index $n_1$, a refraction angle $\theta_t$ of transmitted light St is represented by $$\theta_t = \sin^{-1}\left(\frac{\sin\theta_i}{n_2/n_1}\right).$$

A critical angle $\theta_c$ is the incident angle $\theta_i$ when the refraction angle $\theta_t$ is $\pi/2$, and total reflection occurs when the incident angle $\theta_i$ of the incident light $S_i$ is larger than the critical angle $\theta_c$. This critical angle $\theta_c$ is represented by $$\theta_c = \sin^{-1}(n_2/n_1).$$

The material of the transparent substrate 2 is not particularly restricted as long as it is light-transmitting. For example, glass or plastic used as spectacles can be used as the transparent substrate 2. The refractive index of glass used as spectacles is approximately 1.53 to 1.81, and that of plastic is approximately 1.49 to 1.65. The critical angle at the interface between the transparent substrate 2 and air is about 33.5 to 40.10 when the transparent substrate 2 consists of the above-mentioned glass, and is about 37.3 to 42.20 when the transparent substrate 2 consists of the above-mentioned plastic.

To display color images by using the display device 1 described above, an array of light-emitting diodes or semiconductor lasers of red, blue, and green is used as the light source 3, and the controllers 4 are driven in one-to-one correspondence with these colors. Alternatively, a white-emitting diode array is used as the light source 3, and a color filter is formed on the surface of the controller 4 or the screen 5. In these methods, at least three display elements are required to form one pixel.

It is also possible to interpose a color filter having color regions of three primary colors between the light source 3 and the transparent substrate 2 and change with time its color region positioned on the optical axis of light emitted from the light source 3. When this is the case, one pixel can be formed by one display element.

Figure 6:
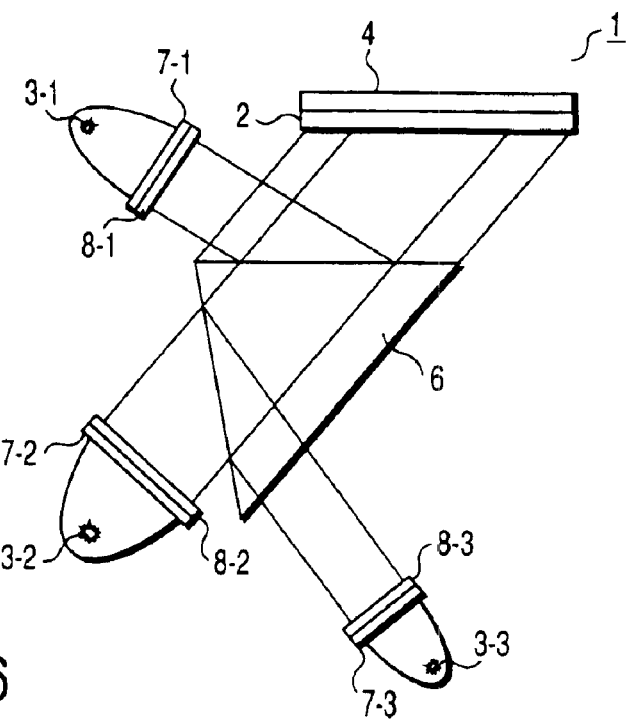
FIG. 6 is a view schematically showing still another example of the display device according to the first to fifth embodiments of the present invention.

Color images can also be displayed using a structure shown in FIG. 6. FIG. 6 is a view schematically showing still another example of the display device 1 according to the first to fifth embodiments of the present invention.

A display device 1 shown in FIG. 6 has a structure in which a transparent substrate 2 having a controller 4, light sources 3-1 to 3-3, red, blue, and blue-green 20 filters 7-1, 7-2, and 7-3, shutters 8-1 to 8-3, and concave parabolic mirrors 11-1 to 11-3 are arranged around a pillar 6 made of a transparent material. A screen 5 is omitted from FIG. 6.

The pillar 6 is formed by combining a pillar having a triangular section and a pillar having a square section. The side surfaces of these pillars are mirror-ground. The transparent substrate 2 is set in contact with one side surface of this pillar 6. The controller 4 is formed on the side of the transparent substrate 2 away from the pillar 6.

This display device 1 shown in FIG. 6 can display desired colors by properly opening and closing the shutters 8-1 to 8-3. That is, it is possible to use one, two, or all of output light components from the light sources 3-1 to 3-3 in display. In this structure, one pixel can be formed by one display element.

In the display device 1 according to the first to fifth embodiments described above, the transparent substrate 2 outputs light having directivity, and the transmitting screen 5 scatters the light to display images. This screen 5 can be a part of the display device 1 or a component separated from the display device 1 such as the wall surface of a room. The display device 1 according to the first to fifth embodiments can also have structures shown in FIGS. 7 and 8.

Figure 7:
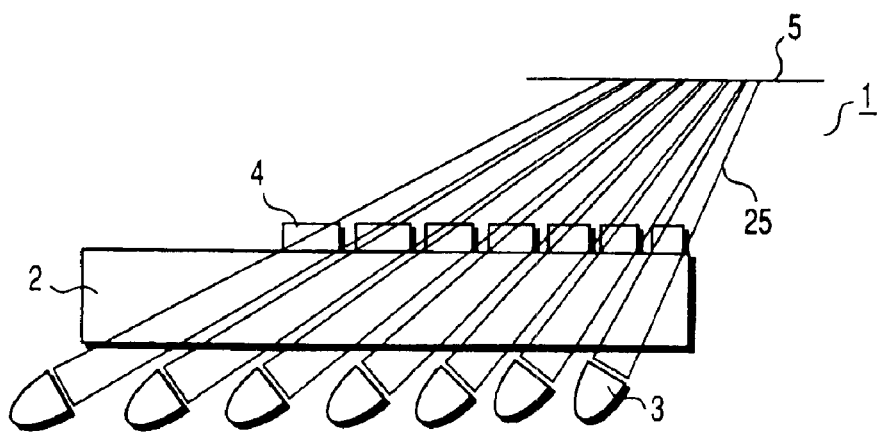
FIG. 7 is a view schematically showing still another example of the display device according to the first to fifth embodiments of the present invention.

FIG. 7 is a view schematically showing still another example of the display device 1 according to the first to fifth embodiments of the present invention. A display device 1 shown in FIG. 7 includes a transparent substrate 2, a plurality of light sources 3, a controller 4, and a screen 5.

This display device 1 shown in FIG. 7 differs from that shown in FIG. 1 in that the optical axes of light components emitted from the light sources 3 are not parallel to each other. Also, the transparent substrate 2 has different refractive indices for different optical paths of output light components from the light sources 3. When the transparent substrate 2 thus having different refractive indices in different portions is used, reduced or enlarged images can be displayed by converging the output light components from the light sources 3 onto the screen 5. Note that the transparent substrate 2 having different refractive indices in different portions can be formed by, e.g., a method of integrating a plurality of transparent members having different refractive indices.

Reduced or enlarged images can also be displayed by another method.

Figure 8:
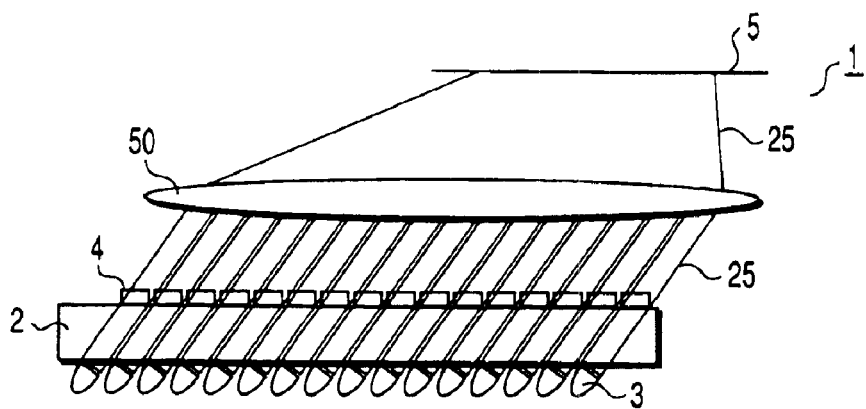
FIG. 8 is a view schematically showing still another example of the display device according to the first to fifth embodiments of the present invention.

FIG. 8 is a view schematically showing still another example of the display device 1 according to the first to fifth embodiments of the present invention. A display device 1 shown in FIG. 8 includes a transparent substrate 2, a plurality of light sources 3, a controller 4, an optical lens 50, and a screen 5. This display device 1 shown in FIG. 8 is different from that shown in FIG. 7 in that reduced or enlarged images can be displayed by using the transparent substrate 2 having a uniform refractive index.

Although in the above description the transparent substrate 2 is used as a light transmitting member, the transparent substrate 2 is not the only one that can be used as a light transmitting member. For example, when a thin transparent film such as a transparent electrode is formed on the transparent substrate 2, this thin transparent film functions as a light transmitting member. Of the embodiments to be described in detail below, in the first to third and fifth embodiments a transparent electrode is primarily used as a light transmitting member.

Figure 9:
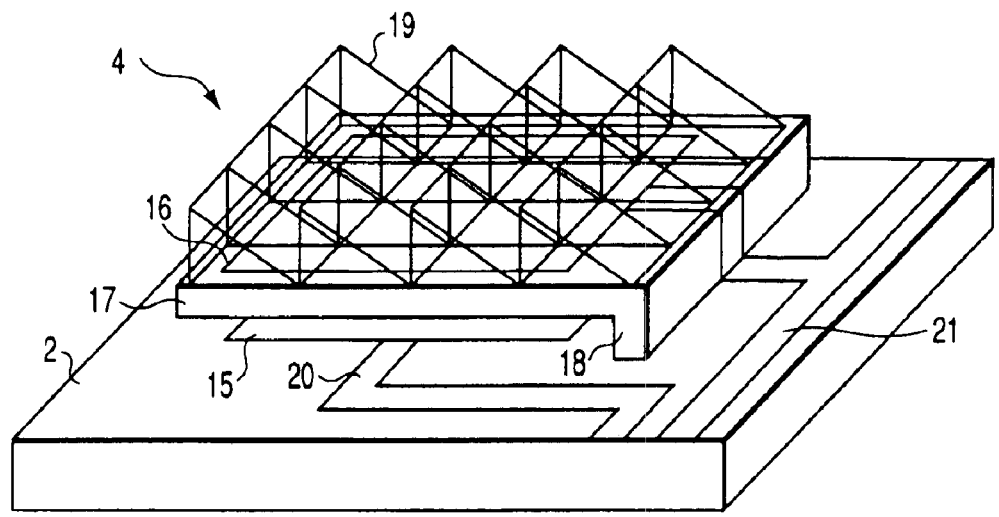
FIG. 9 is a perspective view schematically showing a control mechanism of a display device according to the first embodiment of the present invention.

FIG. 9 is a perspective view schematically showing a controller 4 of a display device 1 according to the first embodiment of the present invention. This controller 4 shown in FIG. 9 has a transparent electrode 15 formed on a transparent substrate 2 as a transparent base, a plate-like transparent member 17 opposing the transparent substrate 2 with a predetermined distance between them, a beam (cantilever) 18 formed on the transparent substrate 2 to support one end of the transparent member 17, a transparent electrode 16 formed on the side of the transparent member 17 away from the transparent substrate 2, and a total reflection preventing member 19 formed on the transparent electrode 16. The transparent electrode 15, the cantilever 18, and the transparent electrode 16 constitute a moving mechanism. Lines 20 and 21 are formed on the transparent substrate 2 and connected to the transparent electrodes 15 and 16, respectively. The operation of the controller 4 shown in FIG. 9 will be described below with reference to FIGS. 10A to 10C.

Figure 10A:
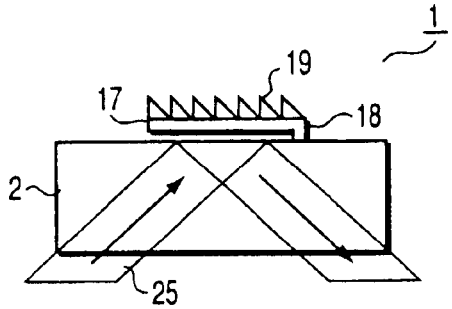
FIGS. 10A to 10C are side views schematically showing the display device according to the first embodiment of the present invention.
Figure 10B:
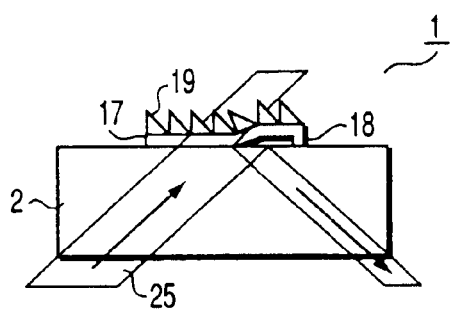
Figure 10C:
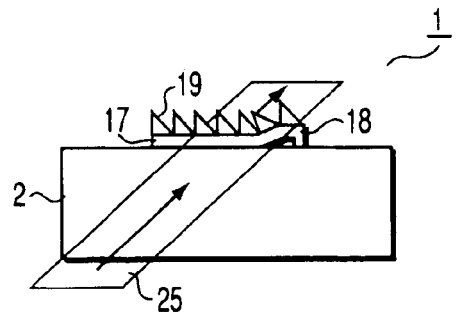

FIGS. 10A to 10C are side views schematically showing the display device 1 according to the first embodiment of the present invention. FIG. 10A shows the state in which no voltage is applied to the transparent electrodes 15 and 16, and the plate-like transparent member 17 and the transparent electrode 15 are separated. In this state, air exists between the plate-like transparent member 17 and the transparent electrode 15, so incident light 25 is totally reflected without exiting to the side of the transparent member 17.

When voltage is applied between the transparent electrodes 15 and 16, as shown in FIG. 10B, the transparent member 17 deforms by electrostatic attraction and partially contacts the transparent electrode 15. Consequently, the incident light 25 partially exits to the transparent member 17.

When the voltage applied between the transparent electrodes 15 and 16 is raised, as shown in FIG. 10C, the transparent member 17 deforms more largely to increase the contact area with the transparent electrode 15. As a result, the incident light 25 nearly entirely exits to the transparent member 17 without being totally reflected. The total reflection preventing member 19 prevents the incident light 25 from the transparent substrate 2 to the transparent member 17 from being totally reflected by, e.g., the upper surface of the transparent member 17 to reenter the transparent substrate 2. Commonly, this total reflection preventing member 19 has the shape of a triangular pillar as shown in FIGS. 9 and 10A to 10C and is so set that its long axis is parallel to the transparent substrate 2 and perpendicular to the optical axis of the light 25.

As described above, when the controller 4 shown in FIGS. 9 and 10A to 10C is used, a transmitted light amount can be controlled, i.e., a grayscale image can be displayed by adjusting the voltage applied between the transparent electrodes 15 and 16.

In the controller 4 shown in FIGS. 9 and 10A to 10C, the space between the transparent member 17 and the transparent electrode 15 with no voltage applied need only separate these parts. Therefore, the controller 4 can be driven with a slight voltage.

Furthermore, in the controller 4 shown in FIGS. 9 and 10A to 10C, the transparent member 17 is parallel to the opposing surface of the transparent substrate 2 with no voltage applied. Hence, even when the transparent member 17 is large, it is unnecessary to increase the space between the transparent member 17 and the transparent electrode 15. That is, the transparent member 17 can be deformed by the same mechanism as when the transparent member 17 is small. This permits the display device 1 to have a large screen.

In the controller 4 shown in FIGS. 9 and 10A to 10C, the transparent member 17 is supported on the transparent substrate 2 by the cantilever 18. When this structure is employed, the relationship between the position of the cantilever 18 and the incident direction of the light 25 with respect to the transparent member 17 is not particularly restricted. That is, the display device 1 can have diverse structures as shown in FIGS. 11A to 11D.

FIGS. 11A to 11D are plan and side views schematically showing the display device 1 according to the first embodiment of the present invention. In each of FIGS. 11A to 11D, a plan view is drawn in the upper half, and a side view is drawn in the lower half. Also, in each of FIGS. 11A to 11D, the light sources 3 and the like are omitted, and the total reflection preventing member 19 is shown only in the side view.

Figure 11A:
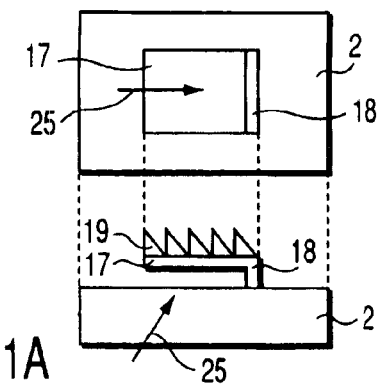
FIGS. 11A to 11D are plan and side views schematically showing the display device according to the first embodiment of the present invention.
Figure 11B:
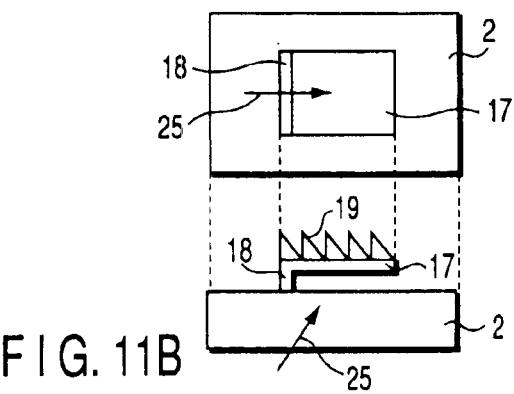

The display device shown in FIG. 11A has the same structure as shown in FIGS. 9 and 10A to 10C. Referring to FIG. 11B, the cantilever 18 is formed in an opposite position to that shown in FIG. 11A.

Figure 11C:
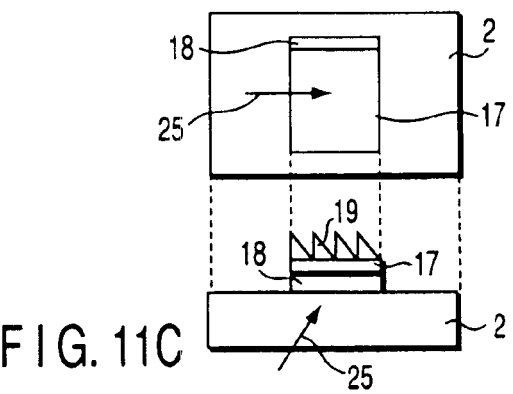

Referring to FIG. 11C, the cantilever 18 is formed parallel to the direction in which the light 25 travels, as shown in the plan view. When the cantilever 18 is thus formed as shown in FIG. 11C, the optical path length of light entering from the transparent substrate 2 into the transparent member 17 with voltage applied is held constant. Therefore, the quantities of light exiting from the transparent member 17 are equal between positions close to and away from the cantilever 18.

Figure 11D:
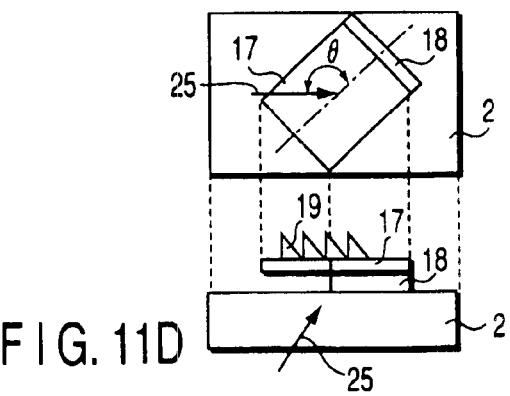

Referring to FIG. 11D, the cantilever 18 is formed obliquely to the direction in which the light 25 travels, as shown in the plan view. In this structure, as shown in the plan view of FIG. 11D, the total reflection preventing member 19 is usually set not to be parallel to the cantilever 18 but to be perpendicular to the optical axis of the light 25.

The display device 1 shown in FIGS. 9, 10A to 10C, and 11A to 11D described above can be driven by using active elements such as TFTs. A method of driving the display device 1 will be described below with reference to FIG. 12.

Figure 12:
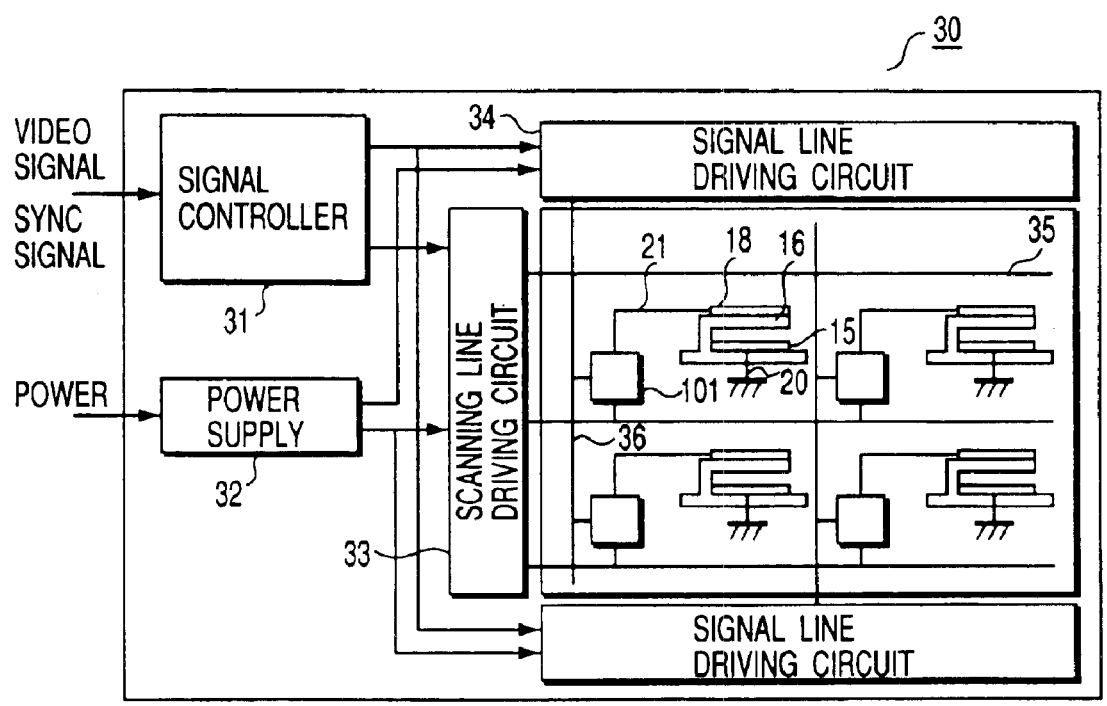
FIG. 12 is a view schematically showing a driving circuit for driving the display device according to the first embodiment of the present invention.

FIG. 12 is a view schematically showing an example of a driving circuit for driving the display device 1 according to the first embodiment of the present invention. A driving circuit 30 shown in FIG. 12 is primarily composed of a signal controller 31, a power supply 32, a scanning line driving circuit 33, and a signal line driving circuit 34.

The scanning line driving circuit 33 applies voltage to each scanning line 35 once per frame. When the scanning voltage is applied to a certain scanning line 35, the signal line driving circuit 34 applies a voltage corresponding to image information between the transparent electrodes 15 and 16 from a signal line 36 via a memory cell 101 connected to that scanning line 35. This signal line driving circuit 34 can be either an analog or digital driving circuit.

Figure 13A:
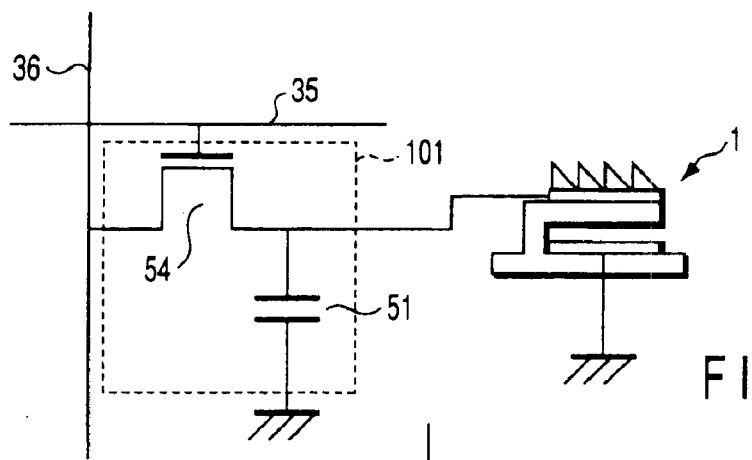
FIGS. 13A to 13C are views schematically showing examples of memory cells in the driving circuit shown in FIG. 12.
Figure 13B:
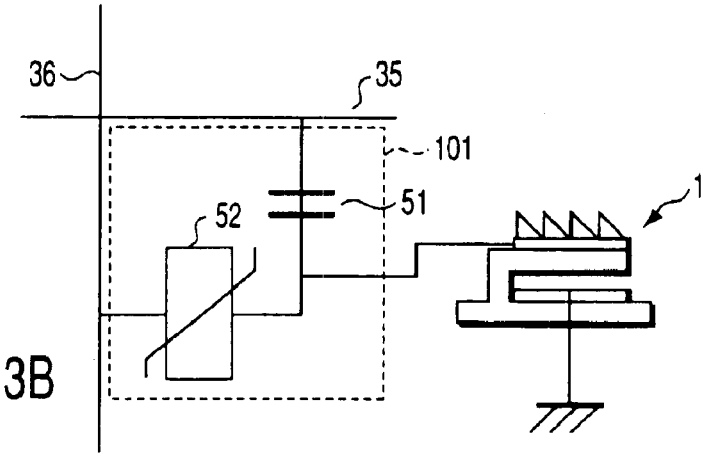
Figure 13C:
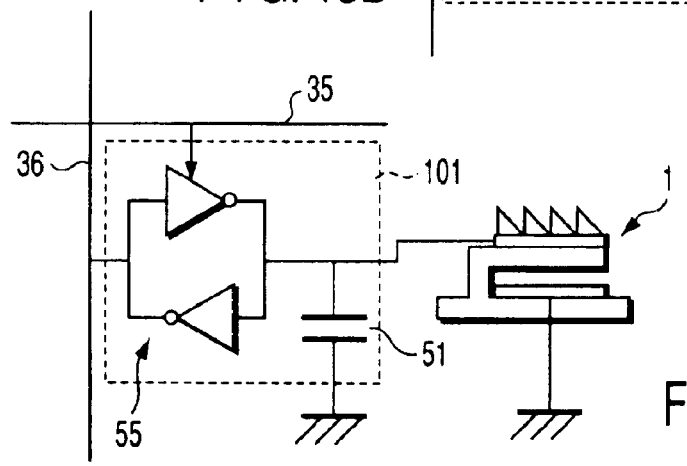

FIGS. 13A to 13C are views schematically showing examples of the memory cell 101 of the driving circuit 30 shown in FIG. 12.

A memory cell 101 shown in FIG. 13A is primarily composed of a holding capacitor 51 and a transistor 54. When the memory cell 101 has a structure like this, electric charge in the holding capacitor 51 disappears by a leakage current or the like. So, a refresh voltage must be applied each predetermined time in accordance with image data.

A memory cell 101 shown in FIG. 13B principally comprises a holding capacitor 51 and a diode 52. When a semiconductor process is used to manufacture the display device 1, the structure of the memory cell 101 shown in FIG. 13B is simpler than that of the memory cell 101 shown in FIG. 13A. This can simplify the manufacturing process and reduce the cost. In the driving circuit 30 having the memory cell 101 shown in FIG. 13B, electric charge of the holding capacitor 51 vanishes by a leakage current or the like. Therefore, a refresh voltage must be applied each predetermined time in accordance with image data.

A memory cell 101 shown in FIG. 13C is primarily composed of a holding capacitor 51 and a bistable circuit 55. Unlike the memory cells 101 shown in FIGS. 13A and 13B, when the memory cell 101 having the structure shown in FIG. 13C is used, no leakage current flows, so no refresh voltage need be applied.

Figure 14:
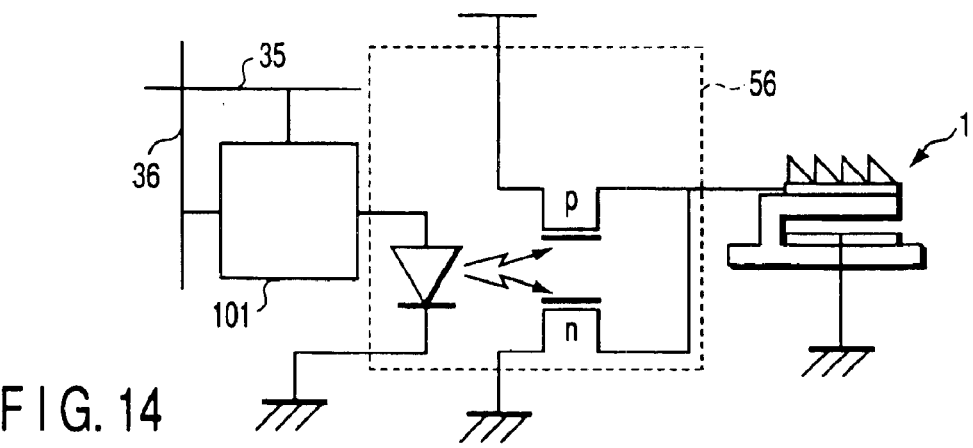
FIG. 14 is a view schematically showing another example of the driving circuit for driving the display device according to the first embodiment of the present invention.

FIG. 14 is a view schematically showing another example of the driving circuit 30 for driving the display device 1 according to the first embodiment of the present invention. Note that FIG. 14 shows a part of the driving circuit 30 in an enlarged scale. Unlike the driving circuit 30 shown in FIG. 12, this driving circuit 30 shown in FIG. 14 has a photo-MOS relay circuit 56. When this driving circuit 30 is used, a high voltage can be applied to the controller 4 of the display device 1. When the display devices 1 are manufactured using a semiconductor process, characteristic variations may occur between the display devices 1 or the memory cells 101. This may cause variations in the operation characteristics of the controllers 4. However, when the photo-MOS relay circuit 56 is formed as shown in FIG. 14, this photo-MOS relay circuit 56 can reduce the influence of characteristic variations between the memory cells 101. Accordingly, when the structure shown in FIG. 14 is employed the manufacturing yield can be improved.

Motion images can be displayed by one- or two-dimensionally arraying the aforementioned display devices 1 and driving each display device by using active elements as described above.

The display device 1 according to the first embodiment as explained above can be manufactured by, e.g., the following method. This method will be described below with reference to FIGS. 15A to 15L.

Figure 15A:
FIGS. 15A to 15L are sectional views schematically showing a method of manufacturing the display device according to the first embodiment of the present invention.

FIGS. 15A to 15L are sectional views schematically showing the method of manufacturing the display device 1 according to the first embodiment of the present invention. In the manufacture of the display device 1, a transparent substrate 2 shown in FIG. 15A is prepared first. Note that lines 20 and 21 made from, e.g., aluminum and the like components are formed on one principal surface of this transparent substrate 2 by vacuum vapor deposition or sputtering, and TFTs and the like are also formed.

Figure 15B:
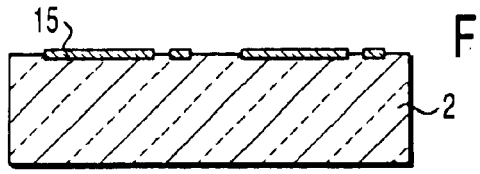
Figure 15C:
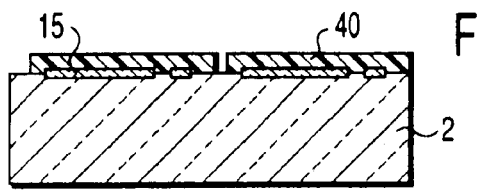

Next, as shown in FIG. 15B, on this principal surface of the transparent electrode 2, a transparent electrode 15 made from a transparent conducting material such as ITO is formed by using sputtering or CVD. After that, as shown in FIG. 15C, a resist film 40 is formed on that surface of the transparent substrate 2, on which the transparent electrode 15 is formed, and this resist film 40 is patterned using lithography.

Figure 15D:
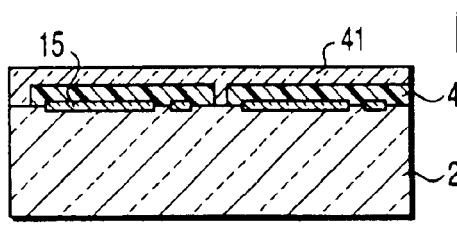
Figure 15E:
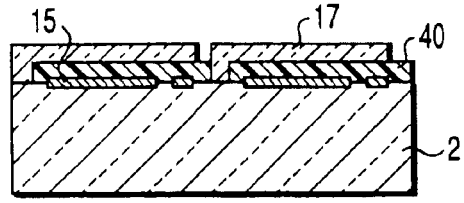
Figure 15F:
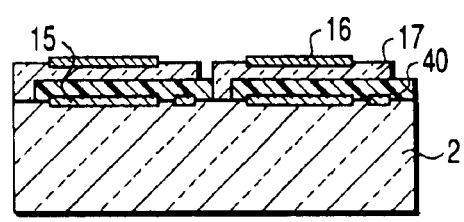

As shown in FIG. 15D, a silicon oxide film 41 is formed on the resist film 40 by using low-temperature plasma CVD. As shown in FIG. 15E, this silicon oxide film 41 is patterned using photolithography to form a transparent member 17 and a cantilever 18. After that, as shown in FIG. 15F, sputtering or CVD is used to form a transparent electrode 16 made from a transparent conductive material such as ITO on the transparent member 17.

Figure 15G:
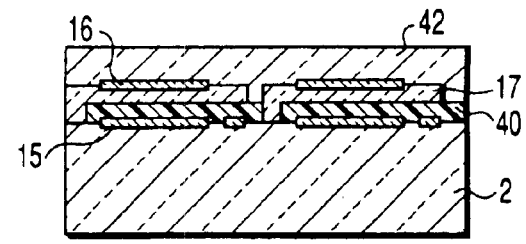
Figure 15H:
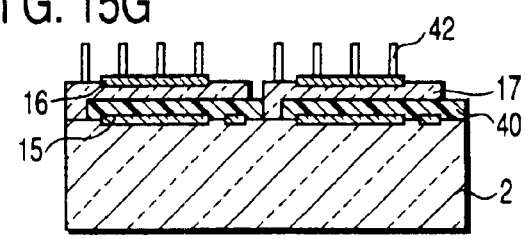
Figure 15I:
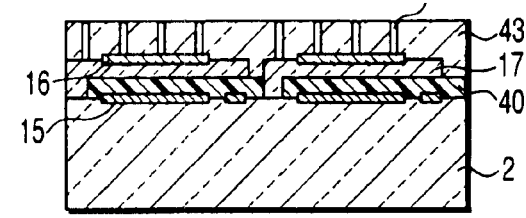

Next, as shown in FIG. 15G, a silicon film 42 is formed on the transparent electrode 16 by using a low-temperature polysilicon film formation technology. This silicon film 42 is formed into thin plates as shown in FIG. 15H by using lithography and RIE. Additionally, as shown in FIG. 15I, on that surface of the transparent substrate 2, on which the thin plates of the silicon film 42 are formed, a thin film 43 is formed using a photosensitive transparent insulating material such as photosensitive polyimide.

Figure 15J:
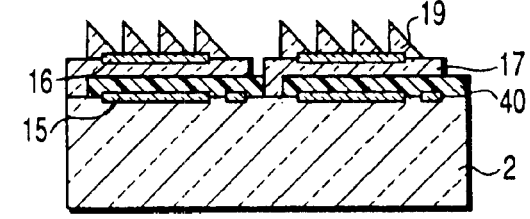

After that, this thin film 43 is obliquely irradiated with parallel light (from the upper left in FIG. 15I) at an angle of, e.g., 45°. Since the thin plates of the thin film 42 are not light-transmitting, portions of the thin film 43 remain behind these thin plates of the silicon film 42 without being exposed. Accordingly, a total reflection preventing member 19 shown in FIG. 15J is obtained by developing the exposed thin film 43.

Figure 15K:
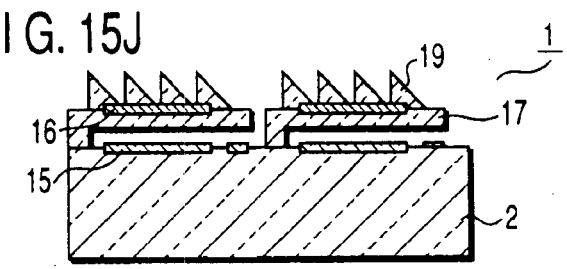

After the total reflection preventing member 19 is formed as above, the resist film 40 interposed between the transparent member 17 and the transparent electrode 15 is removed to obtain a display device 1 shown in FIG. 15K.

Figure 15L:
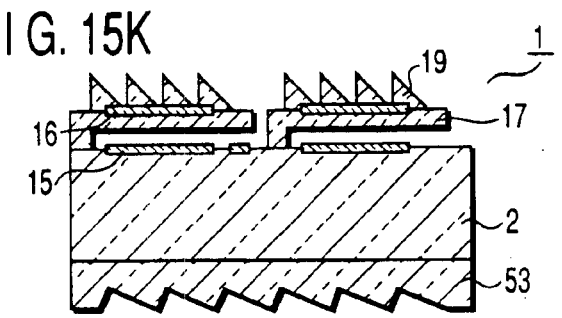

Note that as shown in FIG. 15L, a transparent substrate 53 one surface of which is provided with projections and depressions by embossing or the like is preferably adhered to the surface of the transparent substrate 2 away from the surface on which the thin film 43 is formed. This transparent substrate 53 can improve the efficiency of incidence of light from the light sources 3 into the transparent substrate 2 and can prevent light totally reflected by the interface with the transparent member 17 from being again totally reflected by another interface. An example of this transparent substrate 53 is a PET film (polyethylene terephthalate film). Also, embossing of the transparent substrate 53 can be accomplished by pressing.

In the first embodiment described above, electrostatic force is used to move the transparent member 17. However, magnetic force can also be used. If this is the case, a coil made from aluminum or the like is formed on the surface of the transparent member 17, and an NiFe alloy film is formed on that surface of the light transmitting member 2, which faces the transparent member 17. The transparent member 17 can be closely adhered to the light transmitting member 2 by flowing an electric current through the coil. As an active element for driving this display device 1, an element in which the capacitor of the control circuit shown in FIG. 12 is replaced with the coil can be used.

The transparent member 17 can also be moved by using a piezoelectric element or a bimetal, instead of electrostatic force or magnetic force.

The second embodiment of the present invention will be described below. This second embodiment is the same as the first embodiment except for the shape of a beam 18 for supporting a transparent member 17. That is, while a cantilever is used in the first embodiment, a fixed beam is used in the second embodiment. The rest of the structure is the same. Therefore, in the second embodiment only this difference from the first embodiment will be described.

Figure 16:
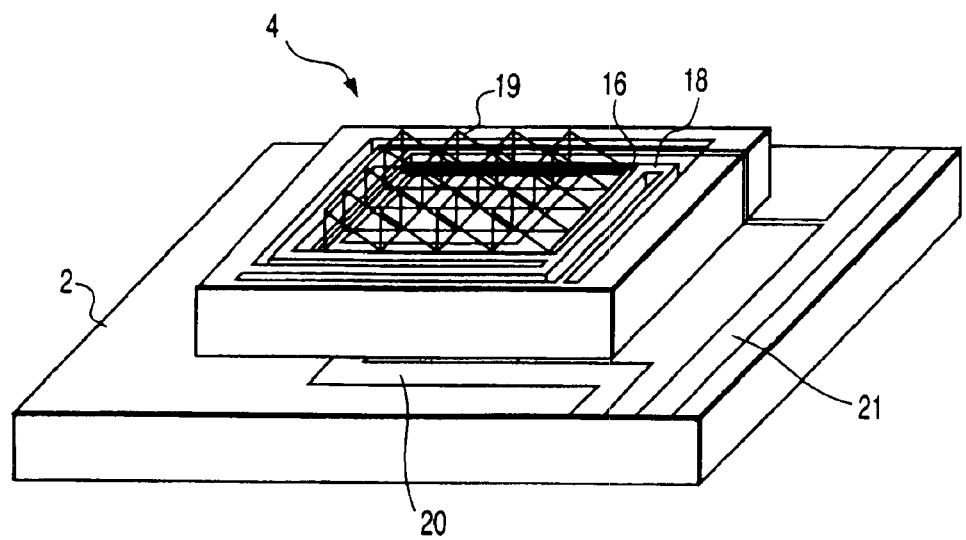
FIG. 16 is a perspective view schematically showing a controller of a display device according to the second embodiment of the present invention.

FIG. 16 is a perspective view schematically showing a controller 4 of a display device 1 according to the second embodiment of the present invention. This controller 4 shown in FIG. 16 includes a transparent electrode (not shown) formed on a light transmitting member 2, a plate-like transparent member (not shown) opposing the light transmitting member 2 with a predetermined distance between them, a beam 18 formed on the light transmitting member 2 to support the periphery of the transparent member, a transparent electrode 16 formed on the surface of the transparent member away from the light transmitting member 2, and a total reflection preventing member 19 formed on the transparent electrode 16. Also, lines 20 and 21 are formed on the light transmitting member 2 and connected to the two transparent electrodes described above. The operation of the controller 4 shown in FIG. 16 will be described below with reference to FIGS. 17A and 17B.

Figure 17A:
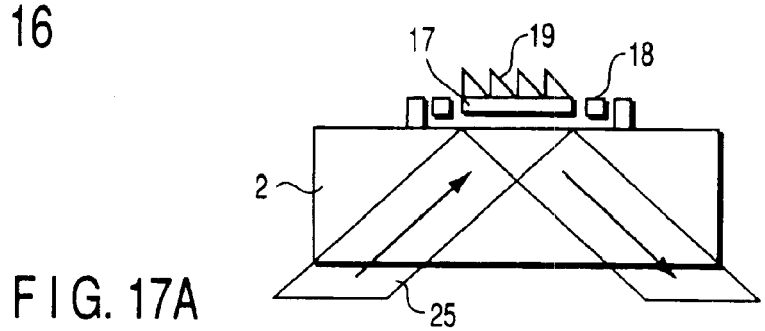
FIGS. 17A and 17B are side views schematically showing the display device according to the second embodiment of the present invention.
Figure 17B:
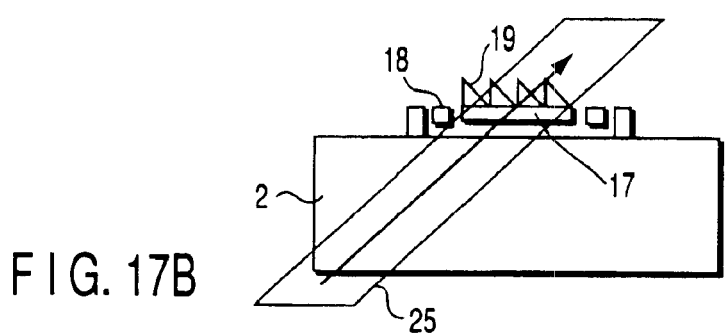

FIGS. 17A and 17B are side views schematically showing the display device 1 according to the second embodiment of the present invention. FIG. 17A shows the state in which no voltage is applied between the transparent electrodes. In this state, a plate-like transparent member 17 and the transparent electrode formed on the light transmitting member 2 are spaced apart from each other. Since air is present between this transparent electrode and the plate-like transparent member 17, incident light 25 is totally reflected without exiting to the side of the transparent member 17.

When voltage is applied between the transparent electrodes, as shown in FIG. 17B, the transparent member 17 deforms by electrostatic attraction and contacts the transparent electrode formed on the light transmitting member 2. As a consequence, the incident light 25 nearly entirely exits to the transparent member 17 without being totally reflected.

In the controller 4 shown in FIGS. 16, 17A, and 17B, the transparent member 17 moves perpendicularly to the principal surface of the light transmitting member 2. Also, unlike when a cantilever is used, the opposing surfaces of the transparent member 17 and the light transmitting member 2 are held parallel to each other. Hence, this display device cannot display any halftone even when the method explained in the first embodiment is applied to the device.

When a double beam is used, a grayscale image can be displayed by using, e.g., the driving circuit shown in FIG. 12. That is, a grayscale image can be displayed by pulse width modulation (PWM) using a signal line driving circuit 34 within a scanning time of approximately 15 to 40 μsec. The signal line driving frequency at this time is a few tens of MHz to 100 MHz. A grayscale image can also be displayed by constituting each pixel by a plurality of independently drivable elements, e.g., by giving each pixel a 16×16 matrix structure.

The third embodiment of the present invention will be described below. This third embodiment is the same as the second embodiment except for the shape of a transparent member 17. That is, while the transparent member 17 is a flat plate in the second embodiment, in this third embodiment a plurality of tapered projections are formed on that surface of the transparent member 17, which faces a light transmitting member 2. In the third embodiment explained below, only the difference from the second embodiment will be described.

Figure 18:
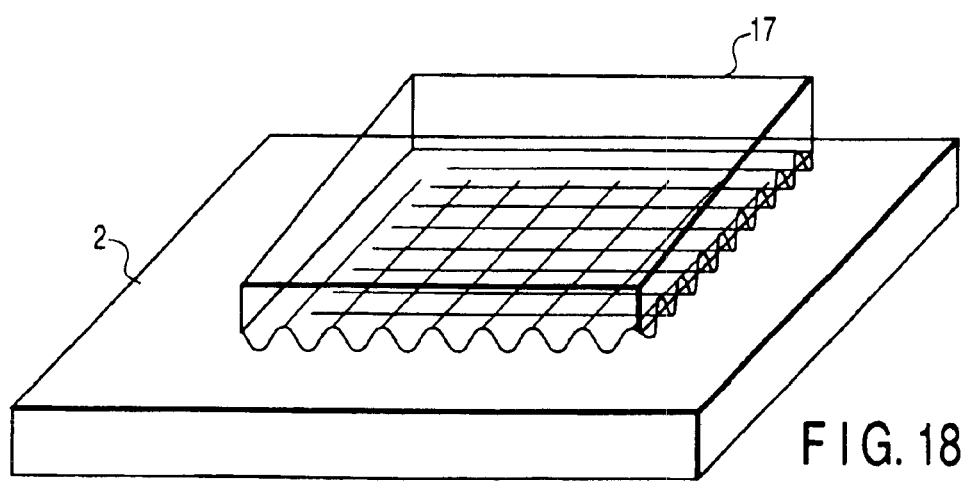
FIG. 18 is a perspective view schematically showing a transparent member of a display device according to the third embodiment of the present invention.

FIG. 18 is a perspective view schematically showing the transparent member 17 of a display device 1 according to the third embodiment of the present invention. A plurality of tapered projections are arrayed on that surface of the transparent member 17 shown in FIG. 18, which faces the light transmitting member 2. This transparent member 17 is made from an elastic material having a small elastic coefficient, such as silicone resin or polycarbonate. Therefore, these projections are deformable. The operation of a controller 4 having the transparent member 17 shown in FIG. 18 will be described below with reference to FIGS. 19A to 19C.

Figure 19A:
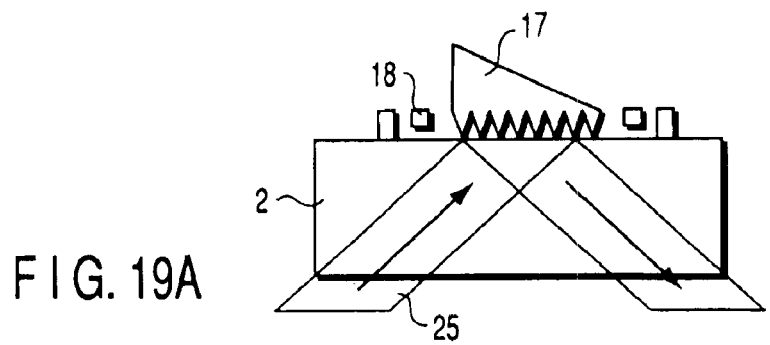
FIGS. 19A to 19C are side views schematically showing the display device according to the third embodiment of the present invention.
Figure 19B:
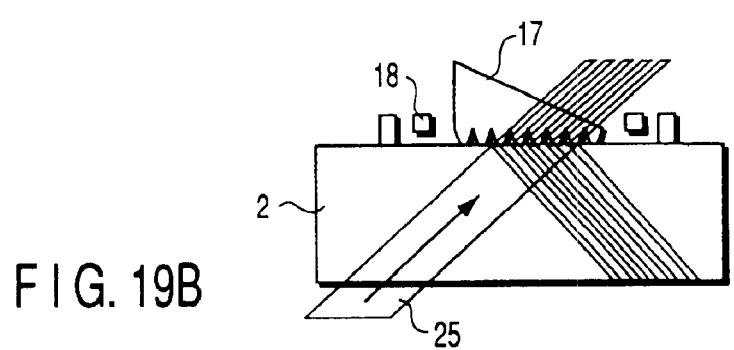
Figure 19C:
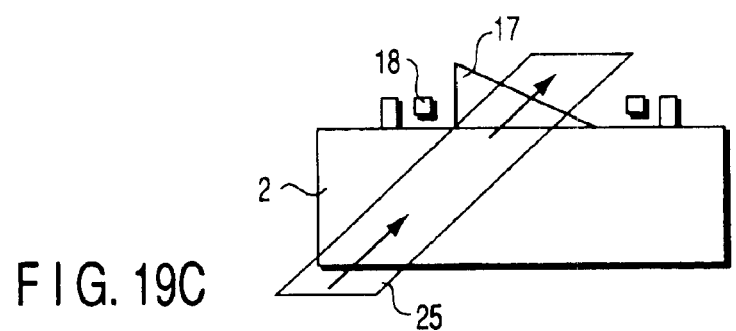

FIGS. 19A to 19C are side views schematically showing the display device 1 according to the third embodiment of the present invention. FIG. 19A shows the state in which no voltage is applied between transparent electrodes. In this state, the transparent member 17 and a transparent electrode formed on the light transmitting member 2 are spaced apart from each other. Since air exists between this transparent electrode and the transparent member 17, incoming light 25 is totally reflected without exiting to the side of the transparent member 17.

When voltage is applied between the transparent electrodes, as shown in FIG. 19B, the projections of the transparent member 17 deform by electrostatic attraction and partially contact the transparent electrode formed on the light transmitting member 2. Consequently, the incident light 25 partially exits to the side of the transparent member 17.

When the voltage applied between the transparent electrodes is raised, as shown in FIG. 19C, the transparent member 17 deforms more largely to increase the contact area with the transparent electrode formed on the light transmitting member 2. As a consequence, the incident light 25 nearly entirely exits to the side of the transparent member 17 without being totally reflected.

As described above, the display device 1 according to the third embodiment of the present invention can display a grayscale image by adjusting the voltage applied between the transparent electrodes.

The display device 1 according to each of the aforementioned first to third embodiments can realize high light utilization efficiency and high contrast. For example, assume that optical glass having a refractive index of 1.81 is used as the transparent substrate 2. Assume also that this transparent substrate 2 has at least one end face and this end face is constructed of a single mirror-ground flat surface.

An ITO transparent electrode 15 having a uniform thickness is formed on this end face. This transparent if electrode 15 is used as a light transmitting member. The relationship between the behavior of light at the interface between the transparent electrode 15 and air and the angle of incidence of light into the transparent substrate 2 can be discussed without considering the refractive index of the transparent electrode 15, if this transparent electrode 15 is formed with a uniform thickness on the transparent substrate 2. That is, the above relationship is equal to the relationship between the behavior of light at the interface between the transparent substrate 2 and air and the angle of incident of light onto the transparent substrate 2. Therefore, the following calculations are done by assuming this condition.

Next, a transparent member 17 made from silicon oxide having a refractive index of about 1.45 is formed by the above method such that this transparent member 17 can move close to and away from that end face of the transparent substrate 2, on which the transparent electrode 15 is formed. Also, a light-emitting diode array is used as a light source 3, and its output light is given directivity by using a microreflecting plate.

When the angle of incidence of light from the light source 3 onto the transparent substrate 2 with respect to the above end face is 35°, total reflection occurs at the interface between the transparent electrode 15 and air if the transparent electrode 15 is exposed to air. On the other hand, if the transparent member 17 is closely adhered to the transparent electrode 15, no total reflection occurs because the critical angle relating to the interface between the transparent substrate 2 and air is about 52°. Consequently, the incident light exits to the transparent member 17. Under the condition, the angle of refraction of light transmitted to the transparent member 17 through the transparent electrode 15 is 45.7°

Assume that light is emitted under the same conditions as above except that a transparent member 17 explained below is used. That is, this transparent member 17 is made from silicon oxide having a refractive index of 1.49. The shape of this transparent member 17 is a triangular pillar having a rectangular equilateral triangular section.

When this transparent member 17 is closely adhered to the transparent substrate 2 and light is emitted under the same conditions as above, the angle of refraction of light transmitted to the transparent member 17 through the transparent substrate 2 is 44.1°. If the azimuth of the transparent member 17 is appropriately set, light entering the transparent member 17 is incident on the interface between this transparent member 17 and air at an angle of 0.9° (45°–44.1°). Since the critical angle pertaining to the interface between the transparent member 17 and air is approximately 43°, the light entering the transparent member 17 is output to the outside without being totally reflected.

Under the above conditions, the transmittance of light output from the light source 3 and transmitted through the transparent substrate 2 is 92%. Assume that no light absorption occurs in the transparent substrate 2 and the transparent member 17, that no light scattering occurs at the interface between the transparent substrate 2 and the transparent member 17 and at the interface between the transparent member 17 and air, and that the transmittance of the transparent electrodes 15 and 16 is 90%. If this is the case, the transmittance of light emerging from the transparent member 17 with respect to output light from the light source is approximately 73%, a high value. That is, the display devices 1 according to the first to third embodiments can achieve high light utilization efficiency. Also, no light emerges from the transparent member 17 when total reflection takes place. Hence, the display devices 1 according to the first to third embodiments can realize high contrast.

In each of the first to third embodiments described above, the display device 1 is manufactured by using a semiconductor process as shown in FIGS. 15A to 15L. To increase the size of a pixel, however, the use of a structure explained in the following fourth embodiment is preferable. That is, a display device 1 having a large screen can be realized by the use of the structure explained in the fourth embodiment below.

Figure 20:
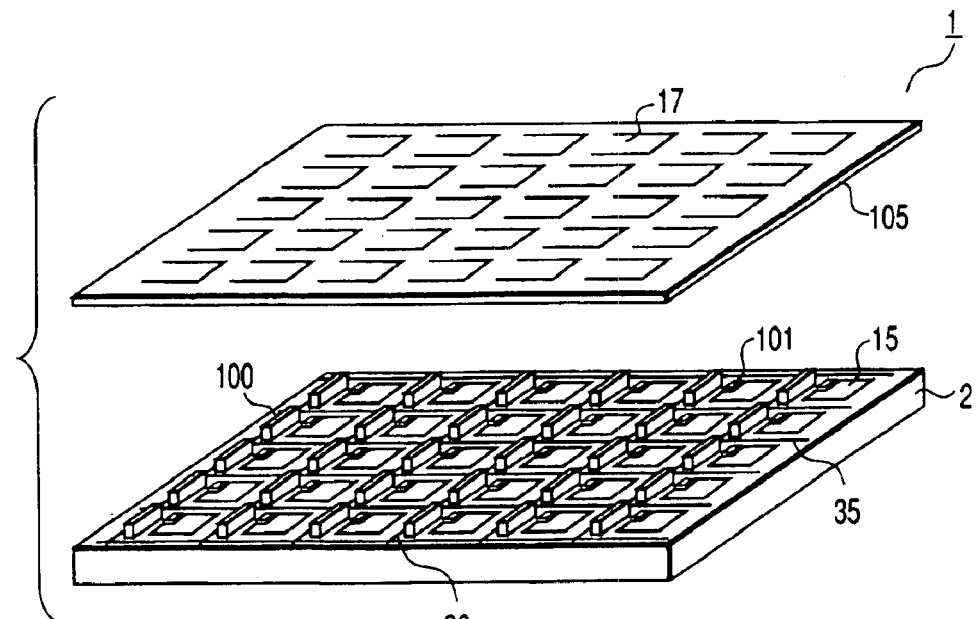
FIG. 20 is a perspective view schematically showing a display device according to the fourth embodiment of the present invention.

FIG. 20 is a perspective view schematically showing a display device 1 according to the fourth embodiment of the present invention. Although transparent substrates 2 and 105 are separated in FIG. 20, in practice the transparent substrate 105 is supported by support members 100 formed on the transparent substrate 2. Also, light sources 3 and a screen 5 are omitted in FIG. 20.

In the display device 1 shown in FIG. 20, a plurality of transparent electrodes 15 are arrayed on one principal surface of the transparent substrate 2. On that surface of the transparent substrate 2, on which these transparent electrodes 15 are formed, lines 35 and 36 for applying voltage to the transparent electrodes 15 and memory cells 101 for holding image data are formed. An insulating film (not shown) and the support members 100 are formed in this order on the transparent electrodes 15, and the transparent substrate 105 is supported by these support members 100. The transparent substrate 105 is conductive and has a plurality of transparent members 17. Also, the transparent substrate 105 is grounded.

This display device 1 shown in FIG. 20 basically has the same structure as the display devices 1 explained in the first to third embodiments. That is, the display device 1 shown in FIG. 20 can display images by the same principle as explained in the first to third embodiments. Accordingly, the driving circuit 30 shown in FIG. 12 can be used.

The display device 1 shown in FIG. 20 differs from the display devices 1 explained in the first to third embodiments in that most components forming this display device 1 shown in FIG. 20 can be formed by laminating sheets or films and patterning the laminated material by a laser processor, a cutter, or the like. That is, the display device 1 shown in FIG. 20 can be manufactured without using a semiconductor process.

When this structure is employed, the pixel size can be increased, i.e., a large-screen display device 1 can be realized. For example, according to this embodiment it is possible by using a 100-μm thick transparent substrate 105 to obtain a display device 1 in which the height of the support 100 is 75 μm and the dimensions of the transparent electrode 15 and the transparent member 17 are 10 mm×10 mm. To display images by this display device, a voltage of about 25 V is applied between the transparent electrodes 15 and the transparent members 17.

The display device 1 shown in FIG. 20 can be manufactured by, e.g., a method shown in FIGS. 21A to 21J.

Figure 21A:
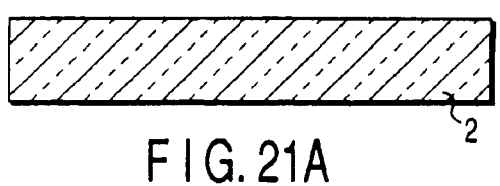
FIGS. 21A to 21J are sectional views schematically showing a method of manufacturing the display device according to the fourth embodiment of the present invention.

FIGS. 21A to 21J are sectional views schematically showing the method of manufacturing the display device 1 according to the fourth embodiment of the present invention. In the manufacture of this display device 1, a transparent substrate 2 shown in FIG. 21A is prepared first. As this transparent substrate 2, a transparent resin substrate such as a PET film can be used.

Figure 21F:
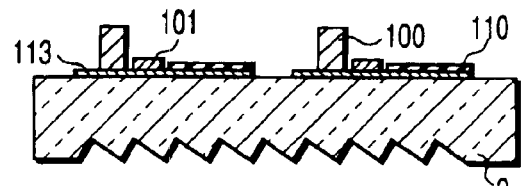
Figure 21B:
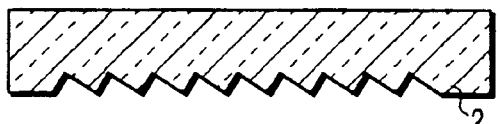
Figure 21G:

Next, as shown in FIG. 21B, one principal surface of the transparent substrate 2 is provided with projections and depressions by embossing or the like. With this uneven surface it is possible to improve the efficiency of incidence of light from the light source 3 into the transparent substrate 2 and prevent light totally reflected by the interface with the transparent member 17 from being again totally reflected by another interface. Note that embossing of the transparent substrate 2 can be realized by pressing.

Figure 21C:
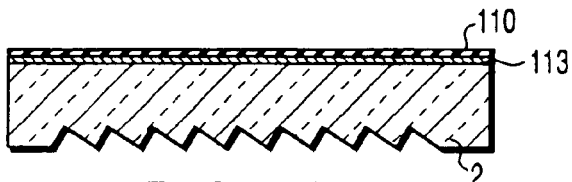
Figure 21H:
Figure 21D:
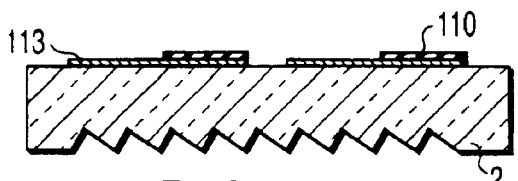

After that, as shown in FIG. 21C, a conductive sheet 113 and an insulating sheet 110 are sequentially adhered to the surface of the transparent substrate 2 away from the roughened surface. As shown in FIG. 21D, a laser processor or a cutter is used to cut the conductive sheet 113 and the insulating sheet 110 in accordance with transparent electrodes 15 and lines 35 and 36. Furthermore, to bond memory cells 111, holes are formed in the insulating sheet 110 to expose portions of the conductive sheet 113. As shown in FIG. 21E, the memory cells 101 are bonded to the exposed portions of the conductive sheet 113 by using a chip mounter or the like.

Next, a sheet is adhered to that surface of the transparent substrate 2, on which the transparent electrodes 15 and the like are formed, and is patterned by using a laser processor or the like. Consequently, supports 100 shown in FIG. 21F are obtained. When the supports 100 and the transparent electrodes 15 are insulated from the lines 35 and 36 by the insulating sheet 113, the sheet used for the supports 100 can be either a conductive sheet or an insulating sheet. However, if the supports 100 and the transparent electrodes 15 are not insulated from the lines 35 and 36, the supports 100 are preferably formed using an insulating sheet.

Subsequently, a conductive transparent substrate 105 shown in FIG. 25G is prepared. As shown in FIG. 21H, one principal surface of this transparent substrate 105 is provided with projections and depressions by embossing or the like. With this uneven surface it is possible to prevent light entering the transparent member 17 from reentering the transparent substrate 2.

Figure 21I:
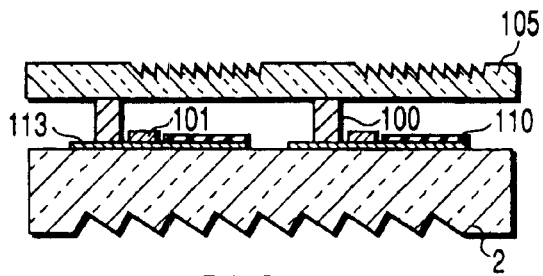
Figure 21E:
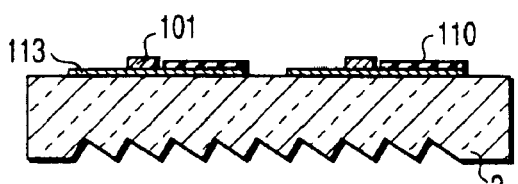
Figure 21J:
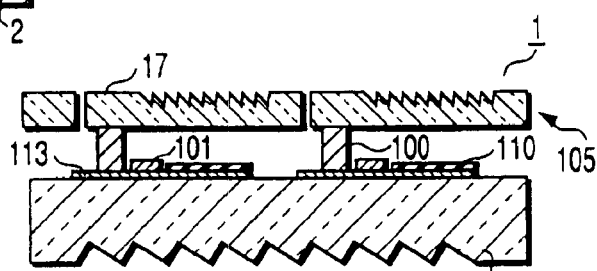

After that, as shown in FIG. 21I, the surface of the transparent substrate 105 away from the uneven surface is adhered to the supports 100. In addition, as shown in FIG. 21J, the transparent substrate 105 is patterned by using a laser beam machine or the like to form a plurality of transparent members 17. In this manner the display device 1 shown in FIG. 20 is obtained.

As described above, the display device 1 according to this embodiment can be manufactured at low cost because it can be manufactured without using a semiconductor process. Also, according to this embodiment a large-screen display device 1 can be easily manufactured.

The fifth embodiment of the present invention will be described below. In the above first to fourth embodiments, the transparent member 17 is used to cause changes between transmission and total reflection. The fifth embodiment uses a liquid instead of this transparent member 17.

FIG. 22 is a side view schematically showing a display device 1 according to the fifth embodiment of the present invention. This display device shown in FIG. 22 includes a transparent substrate 2, a light source 3, a transparent cell 45, a pipe (not shown) one end of which is connected to the transparent cell 45, a vessel (not shown) connected to the other end of this pipe, a micropump (not shown) connected to the pipe, and a transmitting screen 5 as a scattering surface. The transparent cell 45, the pipe, the transparent vessel, and the micropump constitute a supply/removal mechanism, and this supply/removal mechanism is equivalent to a controller 4. The transparent vessel contains a transparent liquid. The operation of the controller 4 shown in FIG. 22 will be described below with reference to FIGS. 23A and 23B.

FIGS. 23A and 23B are side views schematically showing the display device 1 according to the fifth embodiment of the present invention. FIG. 23A shows the state in which the transparent cell 45 is empty. In this state, the internal space of the transparent cell adjacent to the transparent substrate 2 is filled with air and the like, so incident light 25 is totally reflected without exiting to the side of the transparent cell 45.

As shown in FIG. 23B, when a micropump 46 is driven to supply a liquid 48 contained in a transparent vessel 47 into the transparent cell 45 via a pipe 49, the critical angle at the interface between the transparent substrate 2 and the transparent cell 45 changes. Consequently, the incident light 25 nearly entirely exits to the liquid 48 without being totally reflected. Note that the transparent cell 45 has an outer shape similar to that of the total reflection preventing member 19 explained in the first embodiment. Accordingly, the light entering the transparent cell 45 is not totally reflected by the interface between the transparent cell 45 and air.

As described above, the display device 1 according to the fifth embodiment causes changes between transmission and total reflection by moving the liquid. The energy required to drive the micropump 46 is smaller than the energy required to move or deform the transparent member 17 used in the display devices 1 according to the first to fourth embodiments. That is, the display device 1 according to the fifth embodiment can be driven with smaller consumption power.

Also, the display device 1 according to the fifth embodiment described above can realize high light utilization efficiency and high contrast. For example, assume that optical glass having a refractive index of 1.81 is used as the transparent substrate 2 and water having a refractive index of 1.33 is used as the liquid 48. Note that the critical angle between this optical glass and air is 33.5° and the critical angle between the optical glass and water is 47.2°.

Light arriving at an incident angle of 35° from the light source 3 is totally reflected when the transparent cell 45 is not filled with the liquid 48. When the transparent cell 45 is filled with the liquid 48, no total reflection occurs at the interface between the transparent substrate 2 and the liquid 48.

Assuming the transparent cell 45 has the shape of a triangular pillar having a rectangular equilateral triangular section, the light entering the liquid 48 from the transparent substrate 2 is incident on the interface between the transparent cell 45 and air at an incident angle of 6.3°. Accordingly, the light entering the liquid 48 exits to the outside without causing any total reflection. That is, the display device 1 according to the fifth embodiment can realize high light utilization efficiency and high contrast.

The display device 1 according to the fifth embodiment can display a grayscale image by adjusting the amount of the liquid supplied to the transparent cell 45. That is, several transparent cells 45 are connected to constitute one pixel, and the micropump 46, the pipe 49, and the like are connected to only one of these transparent cells 45. When these transparent cells 45 are filled with the liquid 48 step by step from the micropump 46, a grayscale image can be displayed by adjusting the supply amount of the liquid 48.

A grayscale image can also be displayed by connecting the micropump 46, the pipe 49, and the like to each transparent cell 45. If the transparent cell 45 is not completely filled with the liquid 48, in this transparent cell 45 an interface is formed between the liquid 48 and air. If total reflection can be brought about at this interface, only a portion of light entering the liquid 48 from the transparent substrate 2 can be output to the outside. That is, a grayscale image can be displayed.

The micropump 46 of the display device 1 shown in FIGS. 22, 23A, and 23B can be formed by using the micromachine technology disclosed in, e.g., Jpn. Pat. Appln. KOKAI Publication No. 10-274164 or 10-299659 (these documents are incorporated herein by reference). The transparent cell 45, the transparent vessel 47, and the pipe 49 can be formed by using a transparent material such as glass in accordance with a process analogous to that used for the formation of liquid crystal cells.

In the first to fifth embodiments of the present invention as described above, images are displayed by using changes between total reflection and transmission, so no polarizing plate is necessary. That is, high light utilization efficiency can be achieved.

Since the display devices 1 according to the first to fifth embodiments can realize high light utilization efficiency, its light source need not have such high luminance as required for an LCD. Accordingly, the display devices 1 according to the first to fifth embodiments can display images with relatively low consumption power.

In the display devices 1 according to the first to fifth embodiments, the light transmitting member outputs light having directivity. Therefore, the display devices 1 according to the first to fifth embodiments can display images on a scattering surface such as a screen, i.e., can perform projection type image display.

Furthermore, in the first to fifth embodiments of the present invention images are displayed by using changes between total reflection and transmittance. Ideally, therefore, the intensity of light output when dark colors are displayed can be set to 0%, and the intensity of light output when light colors are displayed can be set to 100%. Either light intensity is achievable at high level by reducing light loss resulting from light scattering or reflection. Accordingly, the display devices 1 according to the first to fifth embodiments can display images at high contrast.

In the present invention as has been described above, images are displayed by using changes between total reflection and transmission. In the present invention, therefore, images can be displayed without using any polarizing plate, so high light utilization efficiency can be realized. Also, in the present invention the light transmitting member outputs light having directivity. This makes projection type image display feasible. Furthermore, in the present invention high-contrast image display is possible because images are displayed using changes between total reflection and transmission.

That is, the present invention provides a novel display device and display method having high light utilization efficiency, capable of achieving high contrast, and capable of projection type image display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
    a light transmitting member comprising first and second surfaces;
    a cantilever disposed on the light transmitting member;
    a plate-like transparent elastic member which faces the second surface with a gap therebetween and comprises a first end supported by the cantilever and a second end;
    a light source that irradiates the first surface of said light transmitting member with light; and
    a control mechanism configured to change a contact state of said plate-like transparent elastic member with respect to the second surface of said light transmitting member on an optical path of the light,
    wherein said display device is configured to cause at least a portion of the light emitted by said light source and irradiating said light transmitting member to be output as a light component having directivity from said light transmitting member onto a scattering surface without scattering said light component, said scattering surface spaced apart from said light transmitting member and said control mechanism, and said light component is used to display images, and
    wherein the display device switches the contact state of the plate-like transparent elastic member with respect to the second surface among at least first, second, and third states according to a grayscale image to be displayed, the first state being a state in which the plate-like transparent elastic member is spaced apart from the second surface, the second state being a state in which the plate-like transparent elastic member is deformed such that a portion of the plate-like transparent elastic member on a side of the second end is in contact with the second surface, and the third state being a state in which the plate-like transparent elastic member is further deformed such that a surface area of the plate-like transparent elastic member which is in contact with the second surface is larger than that in the second state.

2. A device according to claim 1, wherein images are displayed by using an intensity change of light transmitted through the second surface.

3. A device according to claim 1, wherein images are displayed by using an intensity change of light reflected by the second surface.

4. A device according to claim 1, further comprising the scattering surface that scatters the light component output from said light transmitting member.

5. A display device comprising:
    a light transmitting member comprising first and second surfaces;

an elastic member made of a light transmitting material and comprising a surface which faces the second surface and is provided with tapered projections;

a beam disposed on the light transmitting member and supporting a periphery of the elastic member;

a light source that irradiates the first surface of said light transmitting member with light; and a control mechanism configured to change a contact state of said elastic member with respect to the second surface of said light transmitting member on an optical path of the light, wherein said display device is configured to cause at least a portion of the light emitted by said light source and irradiating said light transmitting member to be output as a light component having directivity from said light transmitting member onto a scattering surface without scattering said light component, said scattering surface spaced apart from said light transmitting member and said control mechanism, and said light component is used to display images, and wherein the display device switches the contact state of the elastic member with respect to the second surface among at least first, second, and third states according to a grayscale image to be displayed, the first state being a state in which the elastic member is spaced apart from the second surface, the second state being a state in which the elastic member is pressed against the second surface such that each height of the tapered projections decreases, and the third state being a state in which the elastic member is pressed against the second surface such that the tapered projections disappear.

6. A device according to claim 5, wherein images are displayed by using an intensity change of light transmitted through the second surface.

7. A device according to claim 5, wherein images are displayed by using an intensity change of light reflected by the second surface.

8. A device according to claim 5, further comprising the scattering surface that scatters the light component output from said light transmitting member.

9. A display method comprising irradiating a light transmitting member that comprises first and second surfaces with light from a light source and changing a contact state of aplate-like transparent elastic member with respect to the second surface of said light transmitting member on an optical path of the light, wherein the plate-like transparent elastic member faces the second surface with a gap therebetween and comprises first and second ends, the first end being supported by a cantilever disposed on the light transmitting member.

wherein at least a portion of the light incident into said light transmitting member from said light source is output as a light component having directivity from said light transmitting member onto a scattering surface without being scattered, said scattering surface spaced apart from said light transmitting member and said light transmitting material, and said light component is used to display images, wherein irradiating the light transmitting member with light comprises irradiating the first surface of the light transmitting member with light, and wherein changing the contact state comprises switching the contact state of the plate-like transparent elastic member with respect to the second surface among at least first, second, and third states according to a grayscale image to be displayed, the first state being a state in which the plate-like transparent elastic member is spaced apart from the second surface, the second state being a state in which the plate-like transparent elastic member is deformed such that a portion of the plate-like transparent elastic member on a side of the second end is in contact with the second surface, and the third state being a state in which the plate-like transparent elastic member is further deformed such that a surface area of the plate-like transparent elastic member which is in contact with the second surface is larger than that in the second state.

10. A device according to claim 1, wherein the first surface is provided with depressions.

11. A device according to claim 5, wherein the first surface is provided with depressions.

12. A display method comprising irradiating a light transmitting member that comprises first and second surfaces with light from a light source and changing a contact state of an elastic member made of a light transmitting material with respect to the second surface of said light transmitting member on an optical path of the light, wherein the elastic member comprises a surface which faces the second surface and is provided with tapered projections, wherein at least a portion of the light incident into said light transmitting member from said light source is output as a light component having directivity from said light transmitting member onto a scattering surface without being scattered, said scattering surface spaced apart from said light transmitting member and said light transmitting material, and said light component is used to display images, wherein irradiating the light transmitting member with light comprises irradiating the first surface of the light transmitting member with light, and wherein changing the contact state comprises switching the contact state of the elastic member with respect to the second surface among at least first, second, and third states according to a grayscale image to be displayed, the first state being a state in which the elastic member is spaced apart from the second surface, the second state being a state in which the elastic member is pressed against the second surface such that each height of the tapered projections decreases, and the third state being a state in which the elastic member is pressed against the second surface such that the tapered projections disappear.

* * * * *